United States Patent
Ramsbottom et al.

(10) Patent No.: US 12,547,000 B1
(45) Date of Patent: Feb. 10, 2026

(54) ROTATING DIFFUSER FOR IMPROVED IMAGE QUALITY

(71) Applicant: ENVISICS LTD, Milton Keynes (GB)

(72) Inventors: Andrew Ramsbottom, Milton Keynes (GB); Alexander Cole, Milton Keynes (GB); Rakesh Maharjan, Milton Keynes (GB); Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 19/287,753

(22) Filed: Jul. 31, 2025

(30) Foreign Application Priority Data

Mar. 5, 2025 (GB) ..................... 2503216

(51) Int. Cl.
*G02B 27/01* (2006.01)
*G02B 27/00* (2006.01)
*G02B 27/09* (2006.01)

(52) U.S. Cl.
CPC ..... *G02B 27/0103* (2013.01); *G02B 27/0081* (2013.01); *G02B 27/0933* (2013.01); *G02B 2027/014* (2013.01)

(58) Field of Classification Search
CPC ........... G02B 27/0103; G02B 27/0081; G02B 27/0933; G02B 2027/014
USPC ....................................................... 359/630
See application file for complete search history.

(56) References Cited

U.S. PATENT DOCUMENTS

| | | |
|---|---|---|
| 2015/0346491 A1 | 12/2015 | Christmas |
| 2019/0041797 A1 | 2/2019 | Christmas |
| 2019/0064400 A1 | 2/2019 | Tanaka |
| 2019/0212556 A1* | 7/2019 | Sasaki ............... G02B 26/10 |
| 2020/0326464 A1 | 10/2020 | Gomes |
| 2021/0041834 A1 | 2/2021 | Christmas |
| 2022/0252879 A1 | 8/2022 | Christmas |
| 2022/0404770 A1 | 12/2022 | Christmas |
| 2023/0032271 A1 | 2/2023 | Christmas |
| 2023/0064690 A1 | 3/2023 | Smeeton |
| 2023/0204953 A1 | 6/2023 | Smeeton |
| 2024/0241478 A1 | 7/2024 | Boardman |

FOREIGN PATENT DOCUMENTS

| | | |
|---|---|---|
| CN | 117518696 A | 2/2024 |
| GB | 2526275 A | 11/2015 |
| GB | 2635578 A | 5/2025 |
| JP | 2022059920 A | 4/2022 |
| WO | 2018100395 A1 | 6/2018 |

OTHER PUBLICATIONS

International Search Report and Written Opinion for International Application No. PCT/EP2025/056790 mailed on Nov. 18, 2025, date, 12 pages.

* cited by examiner

*Primary Examiner* — William Choi
(74) *Attorney, Agent, or Firm* — McDonnell Boehnen Hulbert & Berghoff LLP

(57) ABSTRACT

A diffuser arranged to rotate around a rotation centre thereof is provided. Each point on the diffuser forms a diffusion profile that is a function of radial distance from the rotation centre but rotationally invariant.

29 Claims, 27 Drawing Sheets

602  600

612  610

602  600

616  614  610

ROTATING DIFFUSER FOR IMPROVED IMAGE QUALITY

CROSS-REFERENCE TO RELATED APPLICATIONS

This application claims the benefit of priority of United Kingdom Patent Application no. 2503216.0, filed Mar. 5, 2025, which is hereby incorporated herein by reference in its entirety.

FIELD

The present disclosure relates to a holographic projector and method of holographic projection. More specifically, the present disclosure relates a holographic projector and method for processing a holographic reconstruction to remove/reduce the perception of speckle. Even more specifically, the present disclosure relates to removing or reducing speckle with the use of a rotating diffuser. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In general terms, the present disclosure relates to a holographic projector and a method of holographic projection. The hologram is a hologram of a picture. The holographic projector and projection method are arranged to reduce/minimise the perception of speckle (or speckle-like interference patterns) in a holographic reconstruction of the picture.

Holographic projectors typically comprise a coherent light source such as a laser. It is well known that the use of coherent light can lead to unwanted interference patterns being formed. That is, the coherent light might interfere with itself. This can create noise (which is not external noise). In the case of holographic projectors, this noise can degrade the image quality of (e.g. virtual) images formed using the holographic projector. One example of this phenomena is referred to as "speckle". The present disclosure refers to holographic reconstruction by way of example of one method of forming an image using light, such as coherent light, that can exhibit speckle-like effects.

A first source of speckle results from diffuse reflections from (imperfect) surfaces. In particular, imperfections of a reflection surface can create fluctuations/subtle phase changes in different portions of an image-such as a holographic reconstruction-reflected by the surface. These phase changes result in spatially varying constructive and/or destructive interference causing light and dark areas in the projected (e.g. virtual) image.

A second source of speckle (or, more accurately, speckle-like noise) arises when the images/holographic reconstructions that are formed by the holographic projector have a relatively high resolution—i.e. relatively high density of image pixels or dots per inch or pixels per degree. It is generally desirable for images to have a high density of pixels. For an image not to appear "pixelated", the points of light/pixels that form that image must be sufficiently close together that they cannot be separated by the eye. However, placing the points of light/image pixels that form the image too close can cause interference between adjacent points/pixels. In particular, cross-talk between light associated with adjacent pixels of the holographic reconstruction causes a speckle-like or grain-like pattern. This interaction/interference may result in a pattern of constructive interference and destructive interference such that there are (unintentional) relatively bright and (unintentional) relatively dark areas in an image of the picture formed by the holographic projector. This pattern may be considered an image pixel crosstalk. However, this pattern is referred to in this disclosure as speckle-like noise or speckle for shorthand. For example, fine details of the image, such as text, become harder to view/read. In an image formed of red, green and blue light of specific wavelengths, colour variation from the intended colour of the image may be exhibited because of different speckle patterns produced by the red, green and blue light sources. For example, intended uniform white areas of an image may exhibit colour variation and so may not appear uniformly white. Various effects of this nature occur in a real-world system and are broadly referred to herein as speckle or speckle-like even though it may be debatable by academics and the like whether the effects are truly examples of laser-speckle in accordance with the strict definitions accepted in the field. In other words, the term "speckle" is used broadly herein to refer to undesired optical effects that result in the appearance of a grainy or speckly image. The grain or speckle is considered "noise" in the image.

It is known to reduce speckle, or the perception of speckle, by moving the screen or light receiving member— at least in systems that use a screen. The screen is typically diffuse and may be referred to as a "diffuser". For example, the diffuser may translate back-and-forth in one-dimension or rotate. Rotation is often preferred because it is continuous and does not require a change in direction which, in practice, cannot be instantaneous. By moving, the region of the light receiving member that is illuminated with the image changes over time, thereby changing the pattern of light of the image that emanates from the light receiving member. This is because statistical imperfections in the light receiving member influence the pattern of speckle so that the pattern changes because a continuously changing set of imperfections is illuminated as the light receiving members moves. As the pattern of speckle changes over time, it is averaged/integrated by the optic system of a human observer, so that the appearance of speckle in the image is reduced.

The holographic projector comprises a display device arranged to form a holographic wavefront by spatially modulating light in accordance with a hologram of a picture displayed thereon. The display device may be a pixelated display device. The display device may be a spatial light modulator such as a liquid crystal on silicon spatial light modulator. The spatial light modulator may be a pixelated spatial light modulator.

In some embodiments, the holographic projector comprises an optical (e.g. magnification) system, or optical relay, comprising a first lens. The first lens may be arranged to receive spatially modulated light from the display device. The first lens is arranged to form an intermediate holographic reconstruction of the picture by focusing the holographic wavefront towards/substantially at a focal plane of the first lens. Said focal plane of the first lens may be referred to as a first or front plane of the first lens. The intermediate holographic reconstruction of the picture comprises a plurality of pixels or points of light.

In some embodiments, the holographic projector further comprises a waveguide which may be referred to as a waveguide pupil expander or pupil replicator or hologram replicator. The waveguide may comprise a pair of opposing surfaces which may be arranged to waveguide light therebetween. The light that the waveguide is arranged to waveguide may be received directly or indirectly from the second lens. A first surface of the pair of opposing surfaces may be partially-reflective partially-transmissive such that a plurality of replicas of the (modified/despeckled) wavefront are emitted therefrom. In such embodiments, the aperture/pupil of a display device may limit the size of a viewing window (e.g. eye-box). The waveguide may be used to form an expanded (increased size) viewing window by creating and emitting a plurality of replicas of the pupil. Each waveguide generates a plurality of replicas of a wavefront formed by illuminating a hologram displayed on the display device.

In some embodiments, the movement assembly is arranged to move a screen or diffuser such that it has a first position with respect to the (intermediate) holographic reconstruction and a second position with respect to the (intermediate) holographic reconstruction. The first position may be different to the second position.

The diffuser may be substantially planar. A first plane may be defined by the substantially planar diffuser. Light of the intermediate holographic reconstruction may propagate towards the diffuser substantially in a first direction. A normal of the first plane may be substantially parallel to the first direction. The movement assembly may be arranged to move the diffuser (rotationally) within the first plane.

As described above, the movement assembly may be arranged to move the diffuser such that the diffuser has a first position with respect to the holographic reconstruction and a second position with respect to the holographic reconstruction. In the first position, the holographic reconstruction may be aligned with a respective region of the diffuser. In the second position, the holographic reconstruction may be aligned with a different region of the diffuser.

As described above, a method of speckle reduction is the use of a moving diffuse (light scattering) screen or light receiving member—i.e., a "diffuser". The diffuser is arranged an intermediate image plane (e.g. at a focal plane of a Fourier lens) and rapidly moved. The positioning at such a plane introduces minimal optical aberrations or loss of contrast. Generally, in optical systems, any surface that is coincident with, or close to, an intermediate image plane will be very sensitive to cosmetic artefacts. That is, these artefacts appear directly, and with high contrast, in the visible projected image. For a diffuser in particular, the "grainy" nature of the diffuse surface will be visible and magnified in the image. Rapidly moving the diffuser, by an amount substantially larger than the diffuser grain size, within the period of persistence of vision, has the advantage, in addition to speckle removal, of effectively eliminating the visibility of such artifacts.

Whilst the diffuser, at any instant in time, will still produce a speckle interference pattern in the image, the spatial details of the pattern will change rapidly as the diffuser is moved. As the eye effectively integrates these spatial image variations over the period of persistence of vision, then provided the movement of the diffuser is sufficiently fast to present an integration of these varying speckle patterns, with a spatially uniform resultant, over this time duration, then the speckle will be effectively mitigated. The simplest, and most effective means to achieve this fast movement is, conventionally, to rotate a scattering diffuser at high speed. Such a diffuser, if designed with an appropriate angular diffusion (in other words, scattering) profile, can also serve to effectively expand the numerical aperture of the laser projection. As such, the diffuser can also be used to fill the viewing window (also known as the eye-box) wherein the projected image is visible to the user.

Diffusers can be designed and manufactured with 2D angular diffusion/scattering profiles approximating a variety of rotationally symmetric luminance characteristics, for example Gaussian, Lambertian or circular flat-top. Diffusers can also be designed & manufactured to approximate non-rotationally symmetric angular scattering profiles, such as elliptical or flat-top rectangular. Depending on the specific design of the display system, there will generally be an optimum 2-D characteristic to the angular scattering profile which would provide the optimum utilisation of laser energy over the specified eye-box area.

Typically, the ideal viewing window (i.e., eye-box) shapes for head-up display systems have a rectangular aspect ratio, since the users tend to have a requirement to move their viewing positions substantially more horizontally than vertically. Furthermore, specifically in waveguide display systems where the pupil expansion is additionally provided by waveguide pupil replication, a substantially uniform 2D rectangular scattering profile over a minimum angular range is preferred. This is since the waveguides are planar components with different design aspects in their two dimensions, such a scattering profile more uniformly fills the individual replicated pupils, so as to achieve uniform pupil luminance with no visible dark or bright band artifacts. For both of these reasons, the most efficient luminance profile is a flat-top rectangular scattering profile.

However, this cannot conventionally be achieved with the known rotating diffusers. The time-averaged luminance profile of the diffusers of the prior art will be rotationally symmetric due to the averaging caused by the rotational movement. That is, whilst a rectangular scattering profile is achievable/observable from a single point of a known diffuser, rotation of the diffuser will result in a corresponding rotation of the produced scattering profile. This results in the desired rectangular scattering profile having to be taken from a circular average of all the rotated scattering profiles (from the various rotational positions of the diffuser). Using such a circular average scattering pile means that it has been the established practice to use a diffuser having a circular scattering profile, as a circular profile is going to be produced via rotation of the diffuser, and a diffuser with circular scattering profile is easier (and therefore cheaper) to manufacture than one with a rectangular scattering profile. However, the areas of such a circular scattering profile that do not fit into the desired rectangular scattering profile represent light that will be lost. This lost light represents a decrease in luminance of the display system, which would require a more powerful (and more energy consuming) light source to provide the desired luminance to the user at the viewing window.

Using a static diffuser would allow the angular scattering profile to be designed to more closely match the desired rectangular scattering profile required for the display, as the lack of movement would reduce or prevent the need to take an average scattering profile as described above. This would result in less lost light, and thus an increase in efficiency and luminance compared to a moving (i.e., rotating) diffuser. However, as previous described, the rapid movement of the diffuser is required to average out the interference speckle pattern. Furthermore, as the diffuser is located at (in other words, on) an intermediate image plane (as any other location may cause a degradation of the contrast of the displayed image), then the granular structure of the diffuser, along with any cosmetic imperfections, may be magnified in the displayed image-thus producing optical artefacts visible to the user.

These issues may be addressed by a translating diffuser (similar to the translating kinoform described above), which would in turn maintain the desired rectangular scattering profile. However, achieving sufficient vibrational speed and amplitude to effectively average out the speckle pattern within the integration period of the human eye and to avoid visibility of the granular image of the diffuser may be mechanically difficult in the context of a head-up display, especially a head-up display for an automotive application, where size constraints are tight. This is further complicated by factors such as the need for the diffuser to vibrate simultaneously in multiple dimensions and the need to avoid significant noise generation. Furthermore, the optical artefacts may still be present at stationary points as the movement if the vibrating diffuser reverses in direction. As such, the mechanical simplicity of a rotating diffuser is generally preferred, but this often comes with the loss of light (and therefore reduced efficiency) issues described above.

Aspects of the present disclosure relate to a so-called "hologram-to-diffuser" display system in which a holographic reconstruction of an image is formed on an image plane which, in some embodiments, is referred to as an intermediate image plane. In accordance with some embodiments, a diffuser is characterised by having a feature size less than the pixel size of the image.

In a first aspect of the present disclosure, a diffuser is provided. As described above, the diffuser is a diffuse screen or light receiving member. The diffuser arranged to rotate around a rotation centre thereof. In other words, the diffuser is arranged to rotate about a central point. In this way, the diffuser may be substantially circular—that is, sufficiently circular that such a rotation thereof does not cause excessive vibrations within a display system of which the diffuser is part. The diffuser motion is therefore via rotation in order to average out the speckle patterns and to reduce the appearance of optical anomalies from the surface of the diffuser, as described above. As such, the movement may be at a speed within the integration time of the human eye. Each point on the diffuser forms a diffusion profile. The diffusion is also referred to herein as a scattering profile. That is, the diffusion profile at each point is the scattering of light that would be observed if said point is illuminated with a single collimated laser beam. The diffusion profile is a function of radial distance from the rotation centre but rotationally invariant. That is, the diffusion profile at each point across the diffuser is dependent on the distance of said point from the centre of the diffuser (i.e., the point about which the diffuser is arranged to rotate). However, the diffusion profile at each point a given distance from said centre of the diffuser is the same relative to the line from the centre of the diffuser to that point. In other words, illuminating a point on the diffuser with an unmoving single collimated laser beam whilst rotating the diffuser (i.e., the point illuminated on the diffuser changes, but the position of the laser beam does not) results in a constant diffusion profile being observed. Terms such a "constant" and "invariant" refer to the diffusion profile being sufficiently the same as to achieve the technical effects described below.

The inventors have identified that a diffuser that produces a rotationally invariant diffusion profile reduces the luminance loss associated with the rotationally variant diffusers of the prior art, as discussed above. As described above, the rotationally variant diffusers of the prior art require a circular diffusion profile so that a rectangular diffusion profile can be utilised for all rotational arrangements of the diffuser. In contrast, with the rotationally invariant diffusion profile of the diffuser according to the first aspect, the diffusion profile for a single, fixed point on the diffuser does not change with rotation of the diffuser.

However, the image formed on the diffuser is not a single point. For a finite size image formed on the diffuser, the diffusion profile will be different for different parts of the image. This impacts the size of the (cross-sectional) area (or light ray volume) that contains all parts of the image. However, the inventors have recognised that, in practice, this impact can be adequately mitigated by providing a diffusion profile that is a function of radial distance from the rotation centre. For example, the inventors have found that a loss (i.e. reduction) in the area of the diffusion profile that can be used in accordance with the present disclosure is much less than with the circular diffusion profiles of the diffusers of the prior art where there is more "deadspace" or a larger unusable portion to the diffusion profile. In summary, the inventors have surprisingly found that a rectangular diffusion profile can be more efficiently used when rotational invariance is required. This was not expected.

Accordingly, any optical inefficiency can be smaller than that of circular diffusion profiles of the prior art, whilst still emitting light that encompasses the desired rectangular diffusion profile. A smaller inefficiency means that there is less wasted light. As such, the inventors have developed a diffuser that wastes less light and therefore has a reduced luminance loss.

In other words, the diffuser of the first aspect results in more efficient utilisation of available light energy, and thus improved luminance in a laser-based display system. It further provides accurate matching of the optimum or desired diffusion/scattering profile required to achieve a uniform luminance distribution across the display image. The diffuser of the first aspect does this whilst maintaining the practical simplicity and advantages of a rotating diffuser—speckle reduction and elimination of the visibility of the granular structure of the diffuser and cosmetic defects.

The diffusion profile may be substantially rectangular. In other words, the diffuser may comprise first and second sides, the first and second sides being perpendicular and the second side having a different length to the first side. The diffusion profile being rectangular has a synergistic benefit with the pupil expansion required in such a display system (e.g., by a waveguide or other replicator). As such, a "substantially rectangular" diffusion profile may be any diffusion profile that has a non-unity aspect ratio and that has such a pupil expansion synergy.

An orientation of the diffusion profile may change (that is, may continuously change) with radial distance. In other words, the function of radial distance comprises an orientation of the diffusion profile that may (continuously) change with radial distance. That is, the diffusion profile may rotate outwards from the centre of the diffuser. This further reduces the area required for the diffusion profiles to match the desired diffusion profile, thus further decreasing the light lost.

An aspect ratio and orientation of the diffusion profile may be invariant with radial distance. Such a diffusion profile may be simpler to design and manufacture. In a further unclaimed embodiment, the diffusion profile may be invariant with radial distance.

A size (in other words, an area) of the diffusion profile may change (that is, may continuously change) with radial distance. In other words, the function of radial distance comprises a size/area of the diffusion profile that may (continuously) change with radial distance. The size of the diffusion profile may decrease with radial distance. The orientation changes experienced by the diffusion profiles on arcs about the centre of the diffuser are lower with an increase in radial distance, due to a decrease in change in angle about the diffuser centre for distance travelled along the arc. As such, the diffusion profiles further towards the outer edge of the diffuser can afford to be smaller whilst still covering the desired diffusion profile. Thus, light lost can be reduced even further.

A shape of the diffusion profile may change (that is, may continuously change) with radial distance. In other words, the function of radial distance comprises a shape of the diffusion profile that may (continuously) change with radial distance. As with the size discussed above, the shape of the diffusion profiles closer to the outer edge of the diffuser may be adjusted to further reduce the light lost. A first pair of sides of the diffusion profile may change with respect to a second pair of sides of the diffusion profile with radial distance.

Each side of the diffusion profile may have a lobe that tapers outwards from a geometric centre of the diffusion profile. In other words, the diffusion profile may have a rectangular shape with protrusions extending from each side. These lobes/protrusions may be triangular in shape. The lobes may be such that the diffusion profile has a rotational symmetry of order 2. The lobes may be such that the diffusion profile has lines of symmetry in two orthogonal directions. That is, it may be said that the diffusion profile has an irregular hourglass shape. Each lobe may have an edge arranged at an angle relative to the corresponding side of the diffusion profile, the angle being in the range of 0° to 45°, such as 3° to 20°. That is, from the sides of the aforementioned rectangular base shape of the diffusion profile, the lobes may have an edge (or side) that extends away from said side of the rectangular shape at these angles. Each side of the diffusion profile may have a pair of lobes that are symmetrical about a central point along said side.

Forming the diffusion profile to include such lobes ensures that the desired/optimum rectangular diffusion profile is produced across the illuminated area of the diffuser, despite the changes in orientation of the diffusion profile at different points across said area. The lobes can be arranged such that the rotation of the diffusion profile across the illuminated area is covered, without the diffusion profile covering an area that will never contribute light to the desired/optimum rectangular diffusion profile. As such, the light lost is further reduced.

In a second aspect of the present disclosure, a display system is provided. The display system is arranged to illuminate the above-described diffuser with an image having a substantially rectangular shape. That is, a shape with an uneven aspect ratio, or a shape as close to a rectangle as the optical constraints of the system allow. The image has a proximal side closest to the rotation centre and a distal side furthest from the rotation centre. The orientation of the diffusion profile changes across the area illuminated by the image, as described above.

An angular difference in the orientation of the diffusion profile at the distal side to the orientation of the diffusion profile at the proximal side may be less than 45°, such as less than 20°. By reducing this change in orientation, the area of the diffusion profile needed to achieve the desired/optimum rectangular diffusion profile can be reduced, thereby reducing the amount of light lost. A distance from the rotation centre to a proximal side of the image may be at least 10% of the distance from the rotation centre to the distal side of the image, such as at least 30%. The inventors have found that, as the rotation of the diffusion profile when moving along an arc of the diffuser further from the centre thereof is lower, moving the illuminated area further from the centre of the diffuser reduces the change in orientation of the diffusion profile across the immolated area, reducing the light lost as discussed above.

The display system may further comprise a rectilinear waveguide (more broadly, a replicator). Light emitted from the diffuser may be coupled into the waveguide. The waveguide is used to expand the size of the image illuminated on the diffuser. An input port of the waveguide corresponds to a shape of the diffusion profile. That is, the diffusion profile may have a shape (such as a rectangular shape) that provides a synergistic effect with the waveguide. The shape of the diffusion profile may assist the waveguide in expanding the image light to fill the required area (eye-box, or viewing window).

The image may extend in a first direction and a second, perpendicular direction. The second direction may be substantially perpendicular to the radial direction. In other words, the (substantially) rectangular shape of the image extends in a first and second direction. The diffuser may form an average diffusion profile along the first direction. That is, the average diffusion profile is the desired/optimum rectangular diffusion profile that must be covered at each point of the illuminated area, as discussed above. The diffusion profile may have an area 105% to 175% the size of the average diffusion profile, such as 110% to 150%. That is, the diffusion profile may be 5% to 75% larger than the average diffusion profile, such as 10% to 50% larger. In other words, the diffusion profile may be larger than the average diffusion profile. That is, the diffusion profile has a larger area than the average diffusion profile (i.e., the desired/optimum diffusion profile), to ensure that the desired/optimum diffusion profile is covered across all points of the illuminated area of the diffuser.

The diffusion profile may correspond to (in other words, encompass) the average diffusion profile at a first orientation and the average diffusion profile at a second orientation. That is, the diffusion profile may have the shape of the average diffusion profile (i.e., the desired/optimum diffusion profile) at the minimum and maximum changes in orientation it would experience across the illuminated area of the diffuser. In this way, the lobed shape as described above is formed, that reduces the light lost. The second orientation may be arranged at a rotation angle relative to the first orientation, the rotation angle being in the range of 0° to 45°, such as 3° to 20°. This rotation angle corresponds to the angle of the extension of the lobes, as described above.

In the present disclosure, the term "replica" is merely used to reflect that spatially modulated light is divided such that a complex light field is directed along a plurality of different optical paths. The word "replica" is used to refer to each occurrence or instance of the complex light field after a replication event-such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances-providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
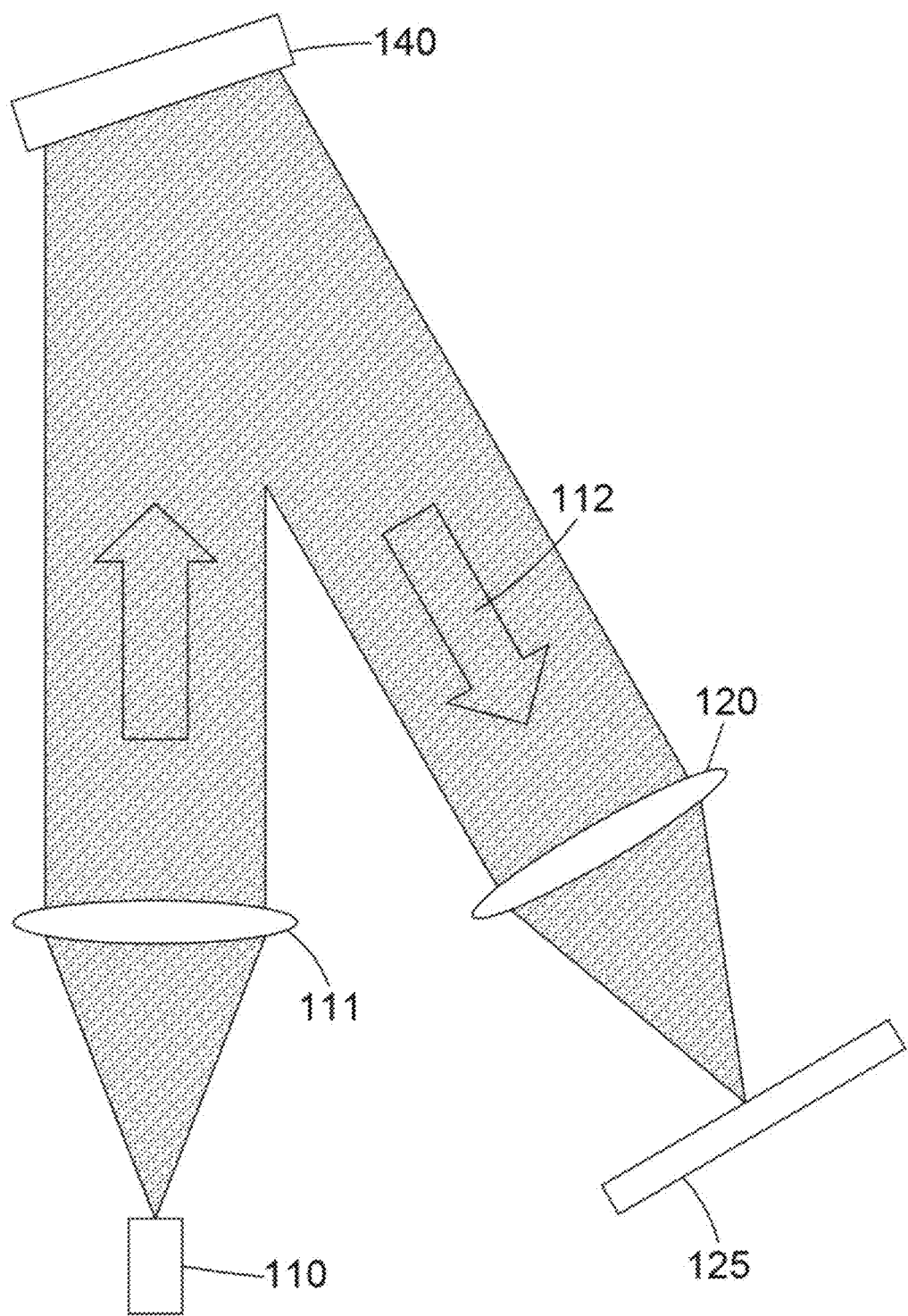
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system.

United Kingdom patent application publication no. 2603517, which is hereby incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. United Kingdom patent application publication no. 2610203, which is hereby incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. United Kingdom patent application publication no. 2614286, which is hereby incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays That are propagated from the display device that can successfully propagate through an eye's pupil to form an image. The display device is generally (in relative terms) small and the projection distance is (in relative terms) large. In some embodiments, the projection distance is at least one-such as, at least two-orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be Less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments-described only by way of example of a diffracted or holographic light field in accordance with this disclosure-a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
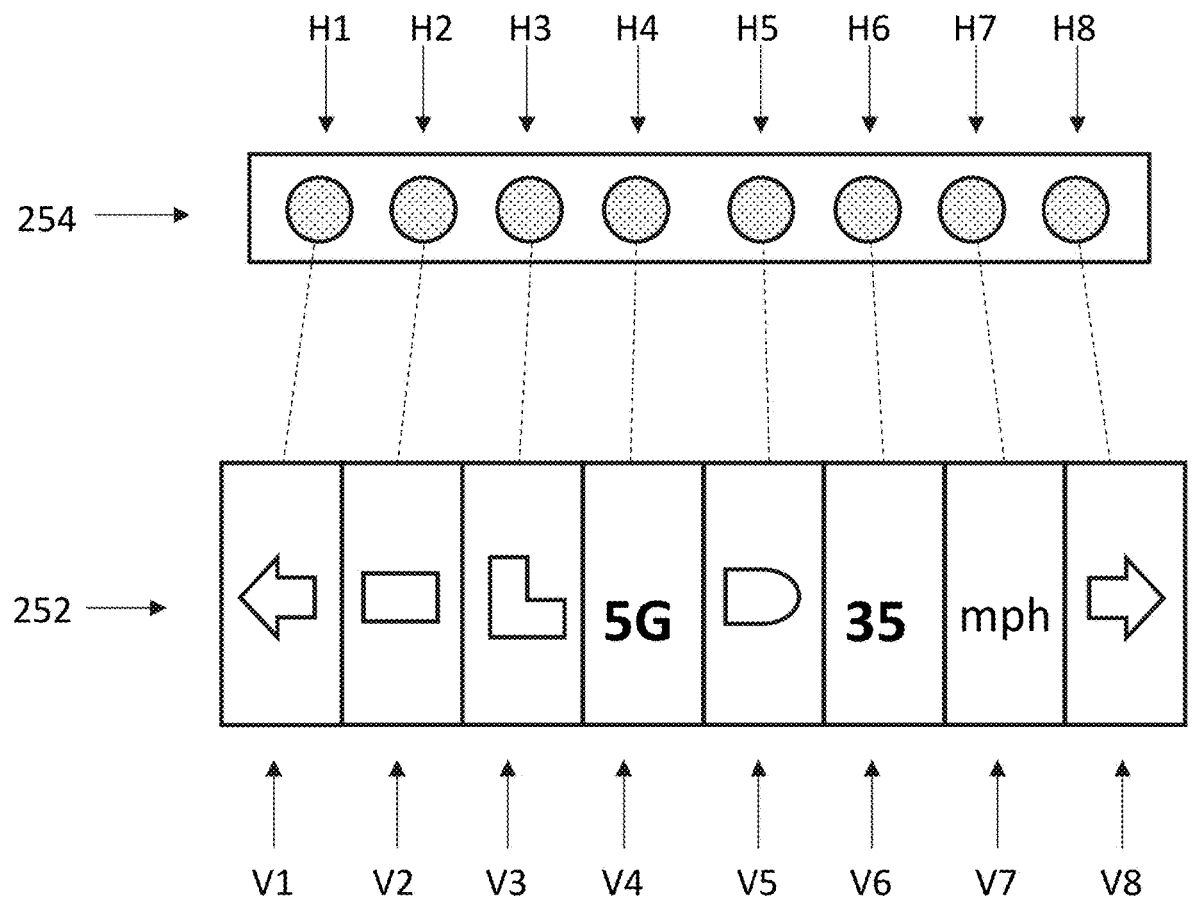
FIG. 2 shows an image for projection comprising eight image areas/components, V1 to V8, and cross-sections of the corresponding hologram channels, H1-H8.
Figure 3:
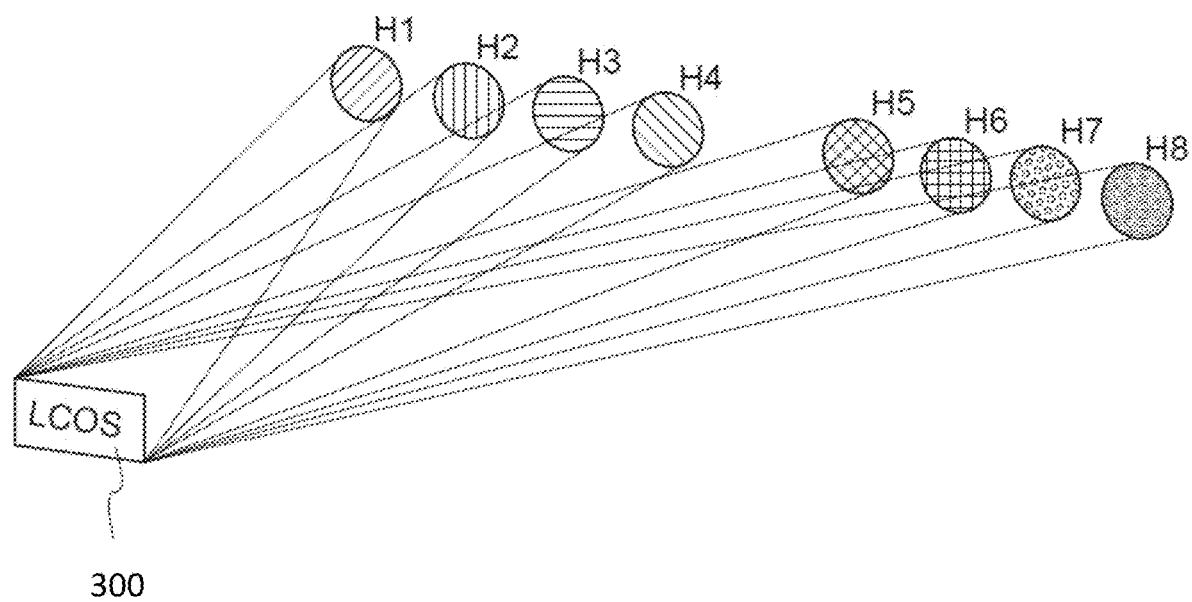
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
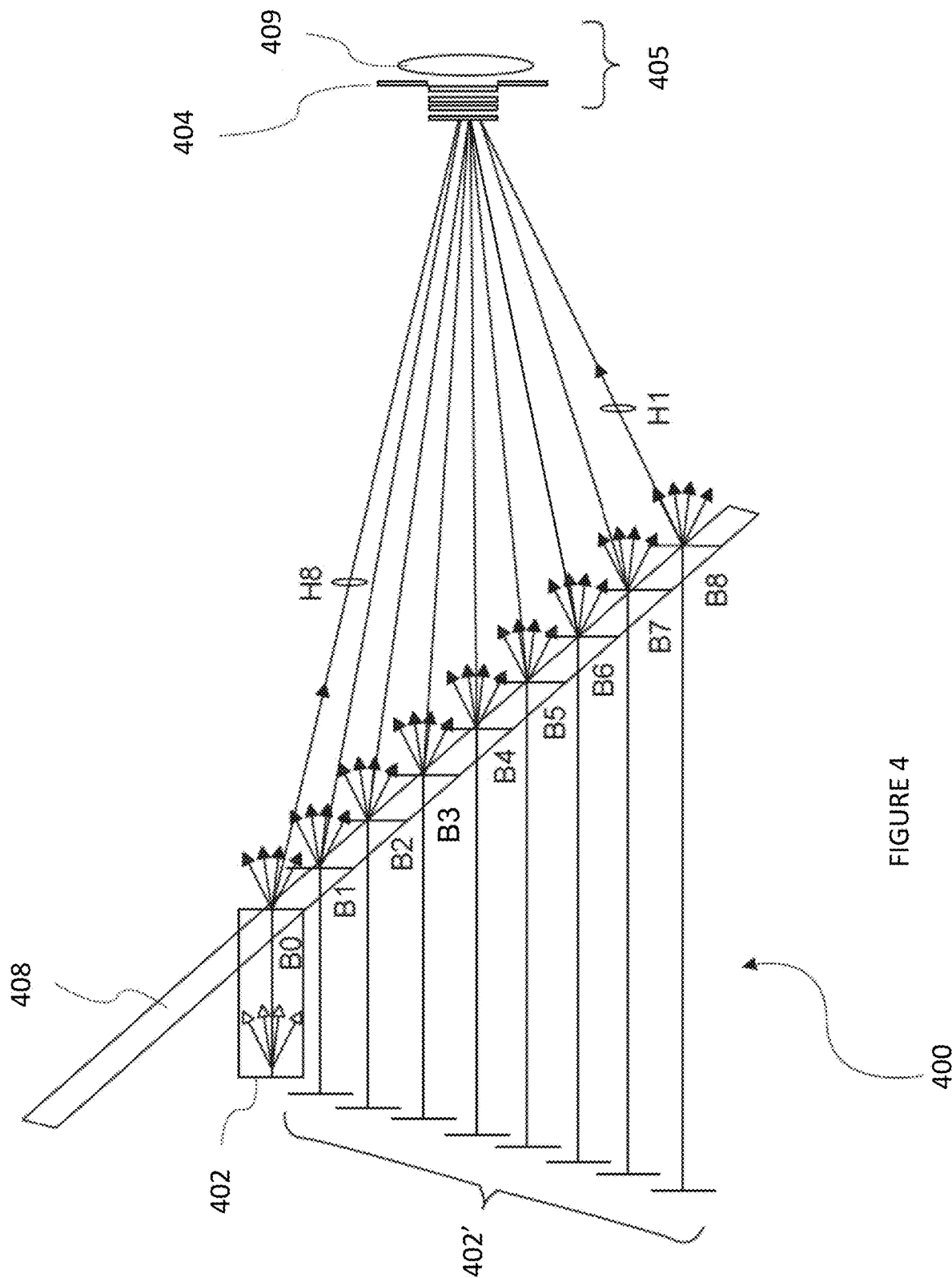
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
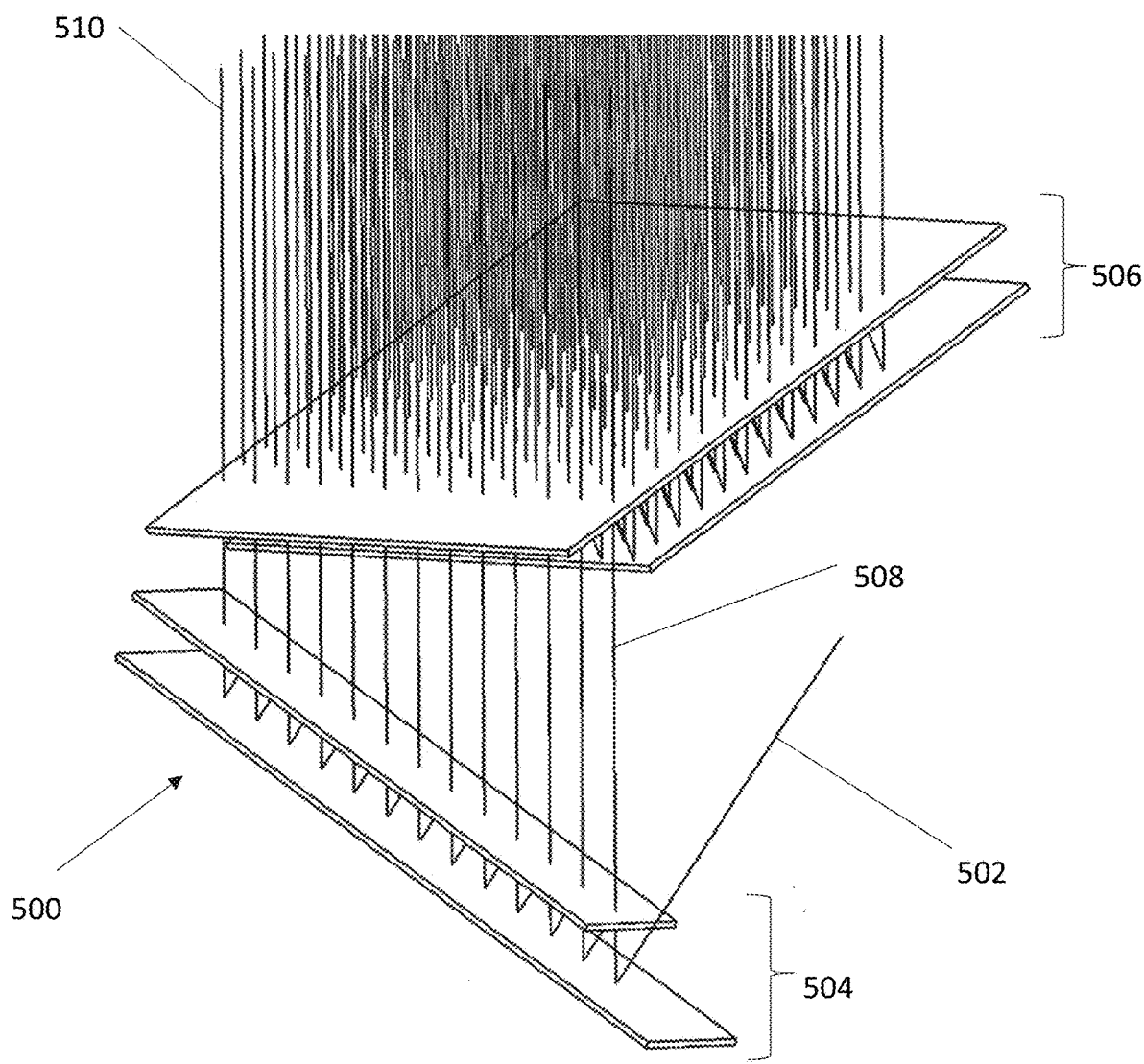
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
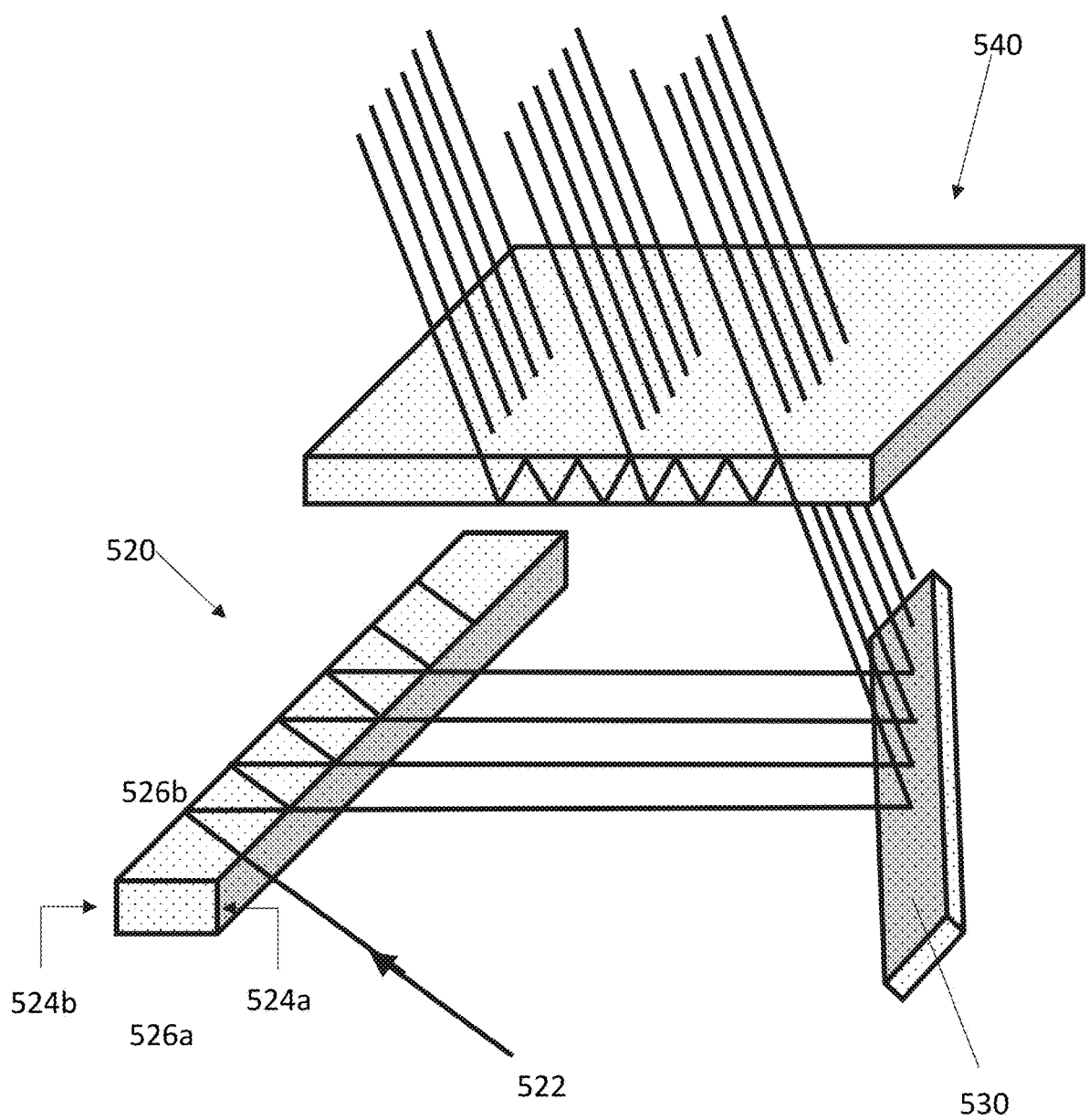
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light-comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system-comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device-such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator-more specifically, the size of the area delimiting the array of light modulating pixels comprised within the SLM-determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The converging or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field-including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent application publication no. 2936252, which is hereby incorporated herein by reference). The present disclosure is compatible with holograms that compensate for the complex curvature of an optical combiner used as part of the projection system. In some embodiments, the optical combiner is the windscreen of a vehicle. Full details of this approach are provided in European patent application publication no. 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. United Kingdom patent application publication no. 2607899, which is hereby incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Speckle in High-Resolution Images

It has been described how a (holographic) projector is arranged to relay light from a display device (SLM) to a viewing system (such as an eye of a user) at an eye-box. The lens of the eye performs a hologram-to-image transformation such that the viewer receives an image. This image is pixelated. That is, the holographic reconstruction comprises image spots or pixels. It is generally desirable for the image to have a high enough resolution that the user cannot perceive the individual pixels. While such a resolution may be high enough to remove the perception of the individual pixels, another problem is introduced. In particular, light associated with adjacent (close together) pixels will interact (interfere) creating a pattern of dark and light areas which degrades the quality of the image. Throughout this disclosure, this effect is referred to as speckle. This is described in more detail below.

FIGS. 6A to 6D show how the speckle effect increases as the resolution of an image increases. For simplicity, amplitude information is omitted from each of FIGS. 6A to 6D.

Figure 6A:
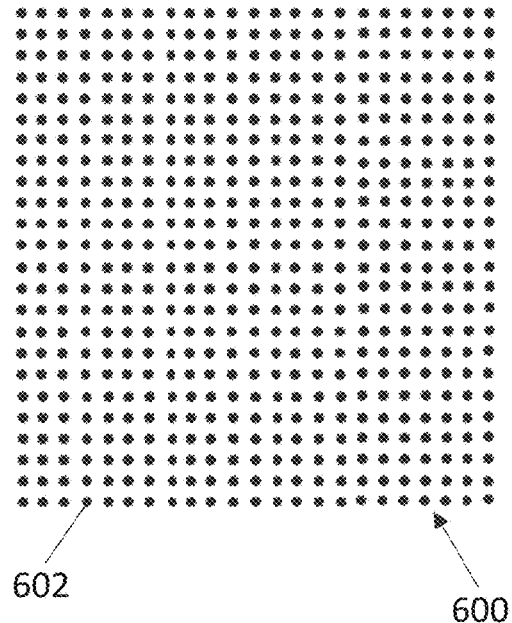
FIG. 6A shows an idealised view of a portion of image pixels of a first image in the form of a uniform array of pixels, the idealised view being absent of interference effects between pixels.
Figure 6B:
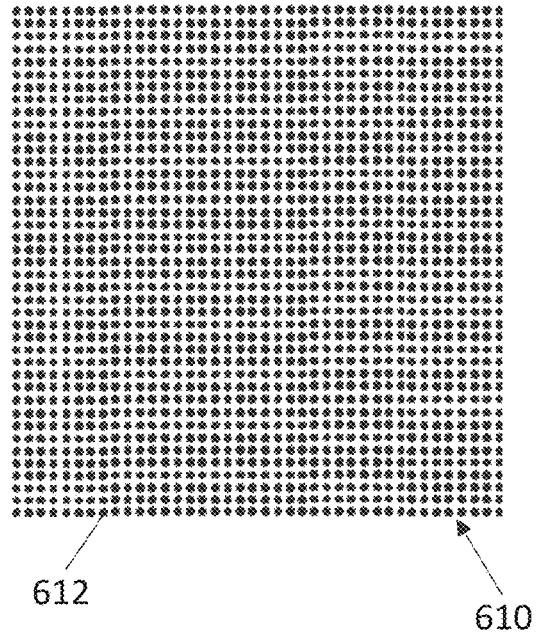
FIG. 6B shows an idealised view of a portion of image pixels of a second image in the form of a uniform array of pixels, the spacing between the pixels of the second image being less than the spacing between the pixels of the first image, and the idealised view being absent of interference effects between pixels.

FIGS. 6A and 6B represent how the pixels of a portion of an image (or holographic reconstruction) would ideally appear in the absence of speckle (specifically, in the absence of interference effect between pixels). FIG. 6A corresponds to a portion 600 of a first image having a relatively low resolution. FIG. 6B show a portion 610 of a second image having a relatively high resolution. Thus, the individual pixels 602 of FIG. 6A are further apart than the individual pixels 612 of FIG. 6B. In the idealised case of FIGS. 6A and 6B, the image pixels of both the first and second images form a uniform array.

Figure 6C:
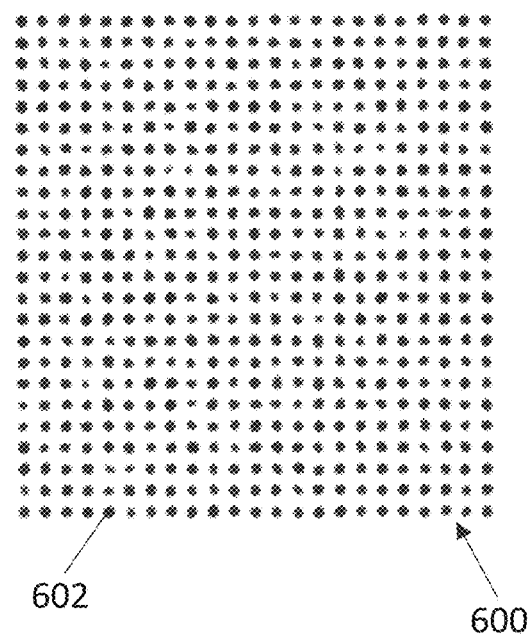
FIG. 6C shows the portion of the first image of FIG. 6A in reality (including interference effects between pixels)
Figure 6D:
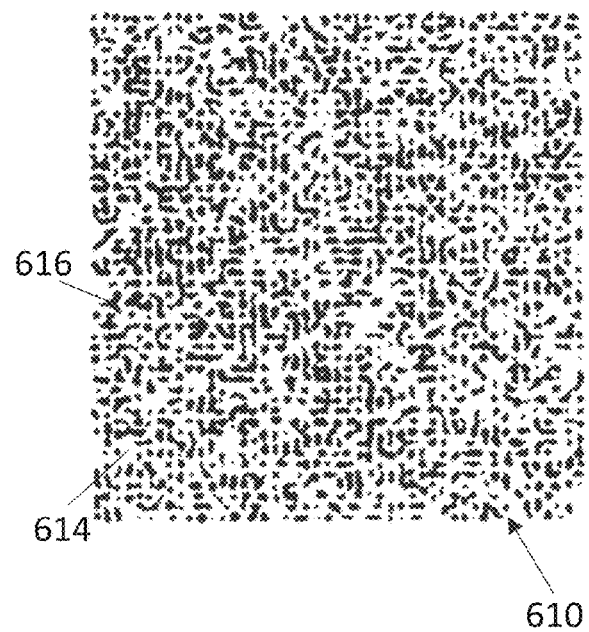
FIG. 6D shows the portion of the second image of FIG. 6B in reality (including interference effects between pixels) and how the relatively smaller pixel spacing in FIG. 6D results in significant deviation from the ideal case as a result of speckle.

FIGS. 6C and 6D represent how the pixels of the portions 602,610 of the images (or holographic reconstructions) appear in reality (including the speckle effect). FIG. 6C shows the portion 600 of the first image but with the speckle effect. FIG. 6D shows the portion 610 of the second image but with the speckle effect.

Because the pixels of the first image (of FIGS. 6A and 6C) have a relatively large spacing, any interference between light of adjacent pixels is minimal. As such, the speckle effect in FIG. 6C is substantially negligible and the pixels maintain their appearance of being in a uniform array. However, the image is unacceptably poor given its low resolution (and so pixelated) nature.

Because the pixels of the second image (of FIGS. 6B and 6D) have a relatively small spacing, the interference between light of adjacent image pixels in the second image is much more significant than in the first image. As such, the speckle effect in FIG. 6D is not substantially negligible. In particular, interference between light associated with pixels of the second image results in dark areas 614 and light areas 616 being formed (which are not present in the idealised case of FIG. 6B). So, as a result of the speckle effect, the image of FIG. 6D does not appear as a uniform points of light but rather is granulated and noisy. So, although the resolution in the second image may be acceptably high so as to, in theory, not appear pixelated, the speckle-effect significantly degrades the quality of the image that is actually perceived.

So, in summary, without speckle mitigation, image quality may either be poor as a result of being too low resolution and appearing pixelated or (at higher resolutions) noisy and so poor because of the speckle-effect.

Figure 7A:
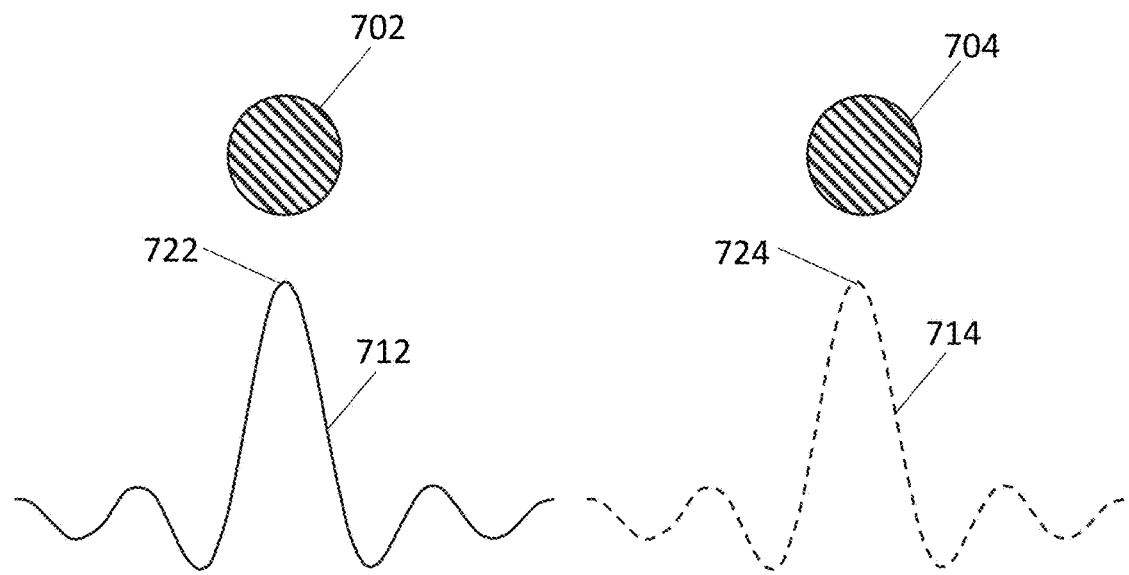
FIG. 7A shows representations of the light field associated with individual pixels of the image of FIG. 6A/6C.
Figure 7B:
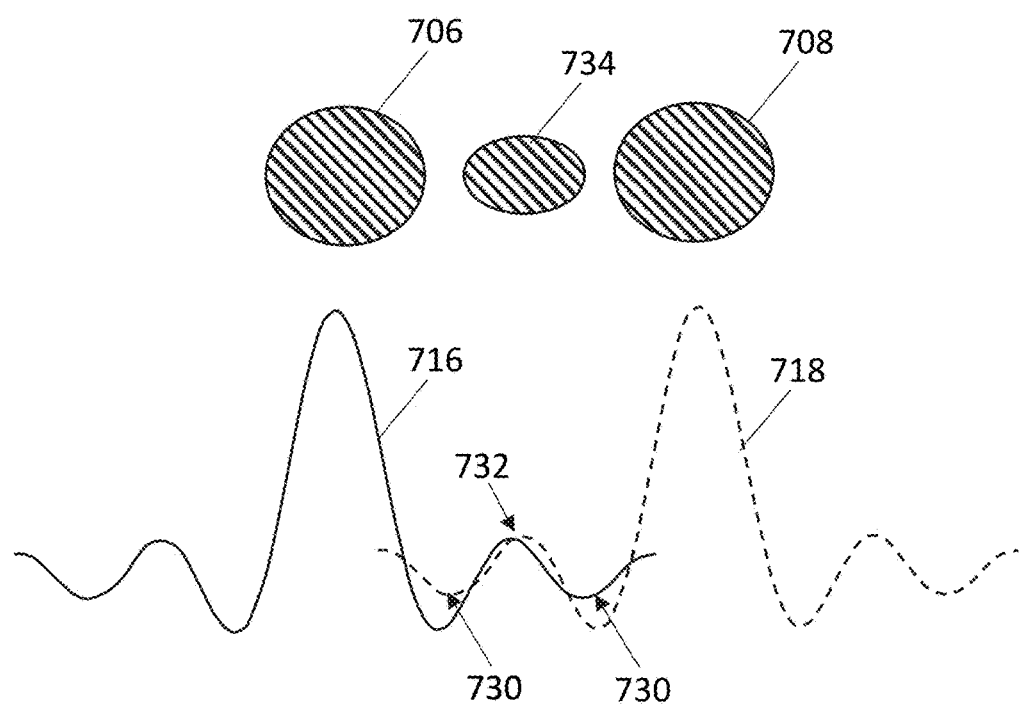
FIG. 7B shows representations of the light field associated with individual pixels of the image of FIG. 6B/6D.

The causes of the speckle shown in FIG. 6D are explained in more detail with reference to FIGS. 7A and 7B. FIGS. 7A and 7B each show representations of the light field associated with individual pixels as well as an intensity profile of the image pixel (which has the form of a sinc squared function). FIG. 7A show representations of the light field associated with individual pixels of the first image (of FIG. 6A/6C). FIG. 7B show representations of the light field associated with individual pixels of the second image (of FIG. 6B/6D).

FIG. 7A represents two adjacent pixels 702, 704 of the first image (of FIG. 6A/6C) and FIG. 7B represents two adjacent pixels 706,708 of the second image (of FIG. 6B/6D). The light associated with each pixel 702 to 708 takes the form of a sinc squared function, also shown in FIGS. 7A and 7B. A first sinc squared function 712 is associated with pixel 702, a second sinc squared function 714 is associated with pixel 704, a third sinc squared function 716 is associated with pixel 706 and a fourth sinc squared function 718 is associated with pixel 708. Only the first and second so-called side-lobes of each sinc squared function (either side of the respective main lobe) are shown in FIGS. 7A and 7B.

As discussed in relation to FIGS. 6A and 6C, the pixels in the first image have a relatively large spacing compared to the pixels of FIGS. 6B and 6D. As such, the two adjacent pixels 702,704 of the first image (shown in FIG. 7A) are further apart than the two adjacent pixels 706,708 (shown in FIG. 7B) of the second image. Each pixel 704 to 708 has an intensity which varies in space substantially in the shape of a sinc squared function. The appearance of the pixels (which are ideally circular) may be affected by interference of the sinc squared functions. In particular, the perceived intensity pattern at any point in space will depend on the sum of the interactions/sum of the value of the sinc squared functions of all the pixels at that respective point in space. For simplicity, two pixels and the respective sinc squared functions are shown in FIGS. 7A and 7B.

The spacing between pixels 702,704 is relatively large, so there is no significant overlap between first and second respective sinc squared functions 712,714, associated with these pixels. Of course, some higher-order side-lobes (not shown in FIGS. 7A and 7B) may interact. But the amplitude of the higher-order side-lobes is so small as to be negligible and so the interference caused by the interaction of the higher-order side-lobes is also negligible. As a result, the main lobes 722,724 of the first and second sinc squared functions 712,714 substantially contribute to substantially circular and spatially separated points of light (pixels 702, 704). The situation is different when the pixels are closer together.

The spacing between pixels 706,708 is relatively small, so there is a significant overlap between the third and fourth sinc squared functions 716,718 associated with these pixels. As can be seen in FIG. 7B, the lobes of the third and fourth sinc squared functions 716,718 are overlapping. In particular, there is some overlap of the second order side-lobes of the third sinc squared function 716 with the main lobe of the fourth sinc squared function 718 (and vice versa). Similarly, the first and second order side-lobes of the third sinc squared function 716 overlap with the first and second order side-lobes of the fourth since function 718. This overlapping resulting in areas of constructive interference and areas of destructive interference. For example, the interaction between the main lobe of each sinc squared function with a second order side lobe of the other sinc squared function is constructive. This constructive interference results in the pixels 706,708 appearing elongated/oval rather than round. The interaction between the side lobes of each sinc squared function (between the main lobes) has two destructive regions 730 and one constructive region 732. The constructive region 732 results in an additional (unintentional) point of light 734 between the pixels 706,708.

For simplicity, FIG. 7B merely shows the interaction of the sinc squared function of two pixels (pixels 706,708). In reality, an image is formed by an array of pixels, with the sinc squared functions of each pixel interacting with at least several other nearby pixels. For example, each pixel may have four adjacent pixels, the light of which each of which may significantly interact/interfere with light of that respective pixel. Thus, the resulting interference pattern is much more complex than that shown in FIGS. 7A and 7B (e.g. see the complex pattern formed in FIG. 6D as a result of speckle/interfernce0. However, it should be clear from the two pixels shown in FIG. 7B how the interference effect of relatively close pixels can degrade image quality. For example, FIG. 7B shows both the effect of the elongation of pixels 706,708 and the introduction of an unintentional bright region between the pixels substantially reduces image quality. In addition, unintentional dark regions may also be created.

The interference described in relation to FIG. 7B and the corresponding reduction in the quality of resulting images is referred to in this disclosure as speckle.

Hologram Processing to Reduce Speckle

FIGS. 9 to 23 show a comparative example to the present disclosure of a variety of kinoforms acting as a despeckler for a "hologram-to-eye" system in which a one-to-one ratio between phase-delay zones of the kinoform to pixels in the displayed image is key. That is, a system in which light is relayed to the user in the hologram domain and the eyes of the user convert the light into a visible image.

Figure 8:
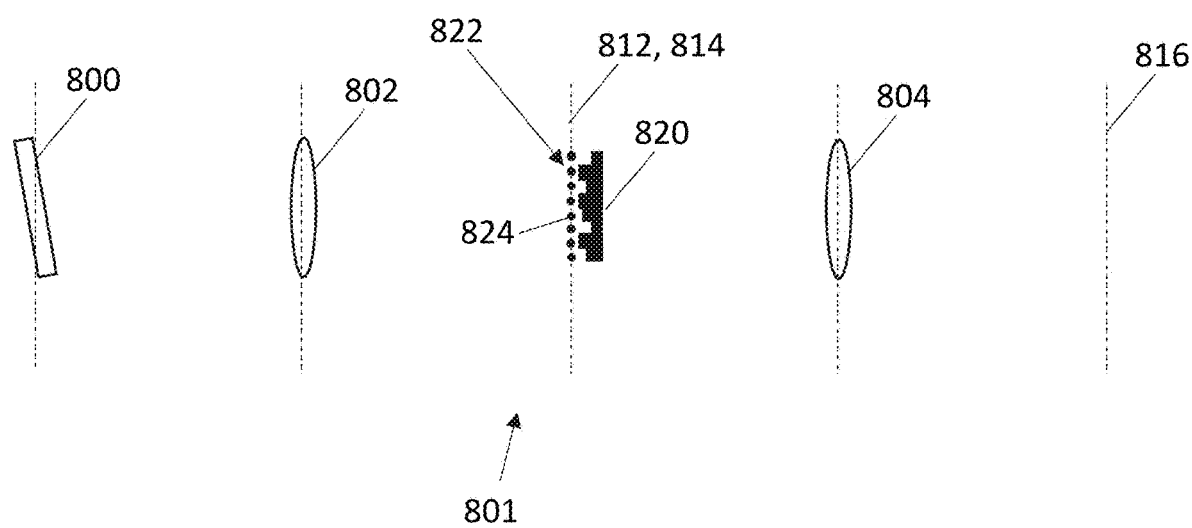
FIG. 8 shows a schematic cross-sectional view showing features of a holographic projector according to the present disclosure.

FIG. 8 is a schematic cross-sectional view showing features of a holographic projector according to the present disclosure. These features are arranged in order to minimise/ reduce speckle in the images formed by the holographic projector. In particular, FIG. 8 shows a spatial light modulator 800 (which, in some examples, is a liquid crystal on silicon pixelated spatial light modulator) and a magnifying telescope 801 comprising a first lens 802 (which, in some examples, is first convex Fourier lens) and a second lens 804 (which, in some examples, is a second convex Fourier lens). The first lens 802 comprises a front focal plane 812. The front focal plane 812 corresponds to the plane at which incoming collimated light is focussed by the first lens 802 and so the front focal plane 812 depends on, for example, the optical power of the lens. The second lens 804 comprises a back focal plane 814 and a front focal plane 816. The back focal plane 814 and the front focal plane 812 (of the first lens) are aligned so as to form a single surface. In some embodiments, the focal length of the first and second lenses 802, 804 is the same such that the front focal plane 812 and the back focal plane 814 are at the midpoint between the first and second lenses 802,804. However, this is optional. A kinoform 820 (which could also be described as a diffractive optical element) is disposed between the first lens 802 and the second lens 804. The kinoform 820 is disposed substantially at the front focal plane 812 of the first lens 802.

The holographic projector further comprises a movement assembly arranged to move the kinoform 820. As will explained in more detail below, the position and arrangement of kinoform are such that rapid movement of the kinoform 820 with respect to the first lens (e.g. with respect to the optical axis of the first lens) substantially reduces speckle.

During operation of the holographic projector, a hologram of a picture is displayed on the spatial light modulator 800. Light is emitted from a coherent light source (e.g. a laser) of the holographic projector, this light is incident the spatial light modulator 800. The light is spatially modulated in accordance with the hologram displayed on the spatial light modulator 800 to form a holographic wavefront. The holographic wavefront is received by the first (Fourier) lens 802 such that holographic light is transformed to the image domain. The first lens 802 focusses the light to form a holographic reconstruction 822 of the image (of the hologram). The holographic reconstruction 822 is pixelated and is represented by the dots 824 shown in FIG. 8. The holographic reconstruction 822 is formed at the front focal plane 812 of the first lens 802 in the example shown in FIG. 8.

The holographic reconstruction 822 interacts with the kinoform 820. The kinoform 820 applies a phase-delay to each pixel 824 of the holographic reconstruction 822. In particular, the kinoform 820 is arranged such that the phase delay applied to each pixel 824 of the holographic reconstruction 822 is different to the phase-delay applied to each pixel that is adjacent to the respective pixel. After the phase-delay has been applied to each pixel, the holographic reconstruction 822 may be referred to as a modified holographic reconstruction (the modified holographic reconstruction having phase delays applied to the pixels relative to the holographic reconstruction 822). Light of the modified holographic reconstruction is received at the second lens 804 to be transformed/reformed into a holographic wavefront.

Figure 9:
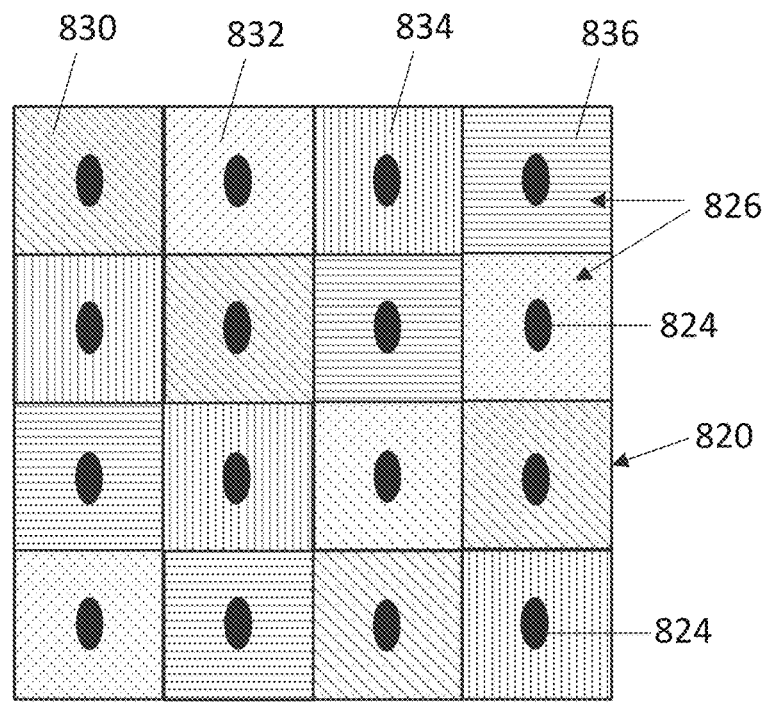
FIG. 9 shows a front view of a portion of a kinoform of the holographic projector shown in FIG. 8 showing pixels of a first holographic reconstruction superimposed thereon.
Figure 10:
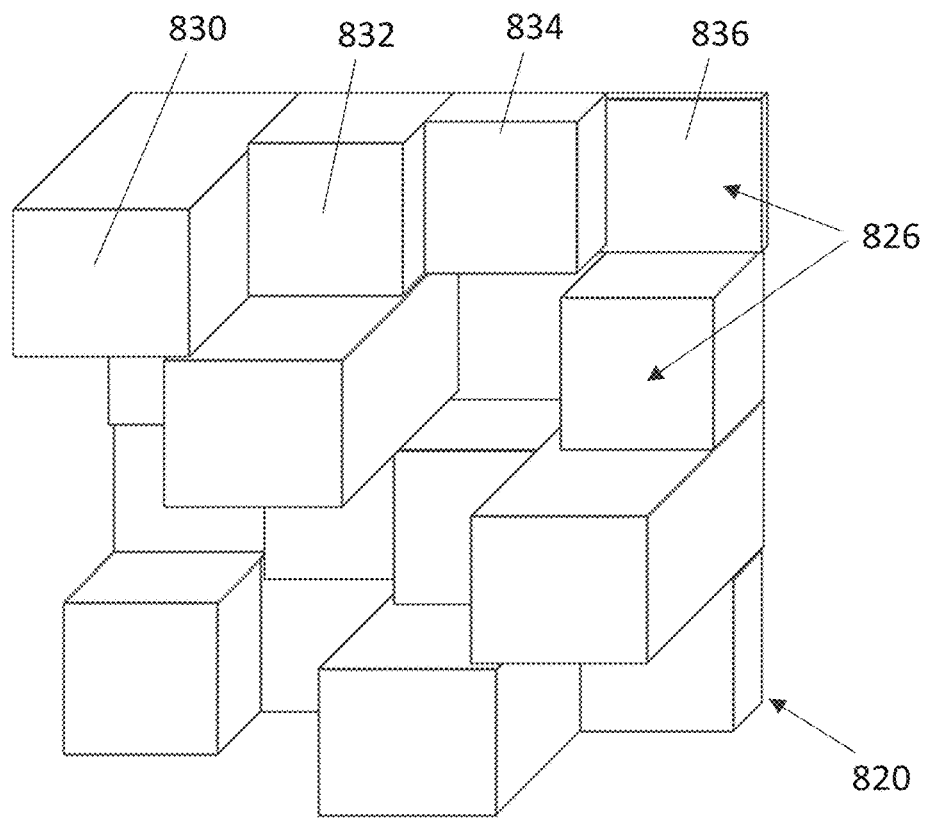
FIG. 10 shows a perspective view of the kinoform of FIG. 9.

FIGS. 9 and 10 show a portion of the kinoform 820 in more detail. FIG. 9 is a front view of the portion of the kinoform 820 with dots/pixels 824 of the holographic reconstruction 822 superimposed thereon. The kinoform 820 comprises an array of discrete zones 826. Each zone 826 in the array of zones is substantially square in shape. In this example, the array is a four by four array of zones (in other words, the array comprises 16 zones). Each zone 826 is aligned with a single pixel 824 of the holographic reconstruction 822. The interpixel distance of pixels of the holographic reconstruction is equal to the width and length of the each zone 826. Each zone 826 of the kinoform 820 is arranged to apply a phase-delay having one of four (different) allowable or discrete values. The different phase delays are represented by the different shading of the zones in FIG. 9. In particular, a first phase-delay value is represented by the diagonal shading (see zone 830, for example); a second phase-delay value is represented by the dotted shading (see zone 832, for example); a third phase-delay is represented by the vertical shading (see zone 834, for example; and a fourth phase-delay is represented by the horizontal shading (see zone 836, for example). Each of the first to fourth phase-delay is between 0 and pi radians.

In some examples, the amount of phase-delay applied by the kinoform 820 to each pixel is dependent on the thickness of the kinoform in a particular zone. In such embodiments, the kinoform 820 comprises a transparent material such as glass or quartz having a refractive index greater than 1. Thus, light propagates more slowly through the kinoform 820 than through air and so the phase-delay applied to light associated with each pixel will increase with increasing thickness. FIG. 10 is a perspective view of the kinoform 820 showing how each zone 830 has a thickness and how zones of the same type (i.e. zones arranged to apply the same phase-delay) have the same thickness. In particular, there are four different thicknesses of zones and these correspond to the same order as the zones shown in FIG. 9.

It should be clear that the number of discrete phase-delay values may be less than or greater than four (for example eight). Furthermore, FIGS. 9 and 10 shows only 16 pixels and 16 zones, however it should be clear that this is representative only and not limiting (in fact, generally the number of pixels and zones will be significantly higher than 16).

Applying the phase-delay to the pixels 824 of the holographic reconstruction (in a way which results in the adjacent pixels having different phase-delays applied) changes the speckle pattern of the image formed at the viewing system. This is because the relative phase of the light associated with adjacent pixels is changed and so the interference pattern (e.g. shown, for example, in FIG. 7B) is also changed.

FIG. 9 shows a portion of the kinoform 820 in a first position with respect to the holographic reconstruction 822. However, as described above, in use of the holographic projector, the kinoform 820 is rapidly moved by the movement assembly (not shown in the Figures). The movement assembly is arranged to move the kinoform 820 translationally in a first plane (the normal of the first plane being parallel to an optical axis of the first lens 802). The movement assembly is arranged to move the kinoform 820 from a first position to a second position relative to the holographic reconstruction. The first and second position are represented by FIGS. 11 and 12 respectively.

Figure 11A:
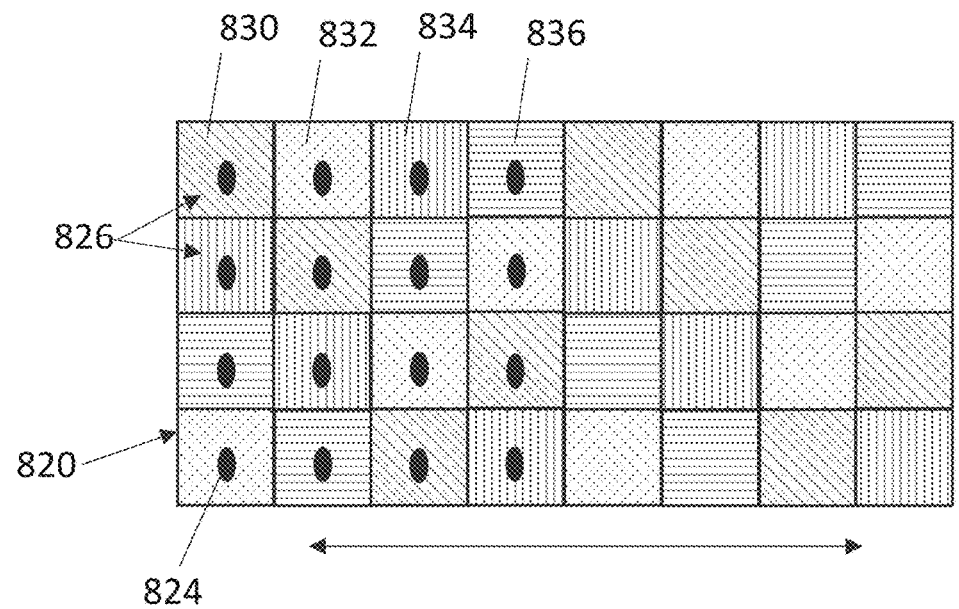
FIG. 11A shows a front view of a larger portion of the kinoform of FIGS. 9 and 10 shown in a first position relative to a holographic reconstruction.
Figure 11B:
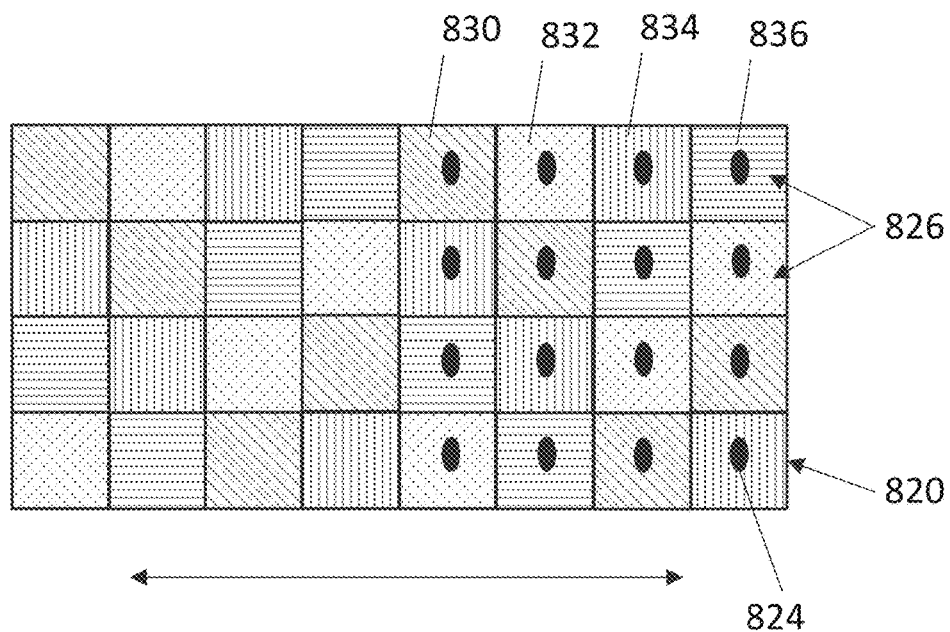
FIG. 11B shows a front view of the larger portion of the kinoform of FIG. 11A shown in a second position relative to the holographic reconstruction.
Figure 12:
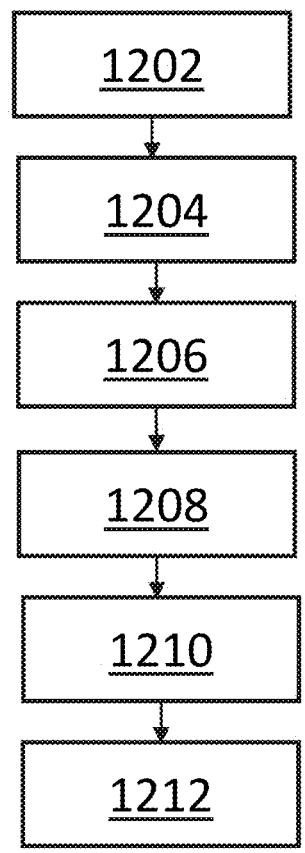
FIG. 12 shows a flow chart of a method of holographic projector according to the present disclosure.

FIGS. 11A and 11B show a larger portion of the kinoform 820 than shown in FIGS. 9 and 10. In particular, FIGS. 11A and 11B show that the kinoform comprises more zones 826 than the holographic reconstruction 822 comprises pixels 824. This means that there are some zones 900 of the kinoform which are not aligned with a pixel 826 in each position. FIGS. 11A and 11B show that the first position and second position are separated be a distance of four pixels (but this is merely optional, other distances between the first and second position are possible). FIGS. 11A and 11B show that, in the second position, each zone 826 of the kinoform 820 is substantially aligned with a different pixel 824 of the holographic reconstruction 822 to the pixel of the first position. It should be clear, that as the kinoform 820 is moved from the first position to the second position (with respect to the holographic reconstruction) each pixel of the holographic reconstruction 822 will be aligned with four different zones and so have four different phase-delays applied. At all times, the phase-delay applied to adjacent pixels is different. So, as the kinoform 820 is moved, four different speckle patterns will be formed at the viewing system.

The inventors have advantageously found that rapidly moving the kinoform between the first and second positions shown in FIGS. 11A and 11B results in a plurality of different speckle patterns being formed at the viewing system. By moving the kinoform at a sufficiently high frequency between the first and second position, this changing speckle pattern is averaged by the optic system of a human observer (because a plurality of different phase-delay values are applied and associated speckle patterns form within the integration time of the human eye). The result is that the appearance of speckle in the holographic reconstruction is reduced. In one example, the inventors have found that a frequency of oscillation between the first and second position of the kinoform of 1 kHz is a suitable value.

In the example above, the kinoform is moved translationally between the first position and the second position. In other examples, the kinoform may be moved rotationally. Furthermore, in the example above, the kinoform is transmissive, with light of the holographic reconstruction being transmitted through the kinoform. In other examples, the kinoform may be reflective. For example, the kinoform may comprise a reflective coating on a back surface arranged to reflect light of the holographic reconstruction.

FIG. 12 shows a flow chart of a method of holographic projector according to the present disclosure and using the holographic projector described above.

Step 1202 of the method comprises displaying a hologram of a picture on a display device (in particular the spatial light modulator 800 described above). Step 1202 may optionally comprise calculating the hologram first. The hologram may be a computationally generated hologram.

Step 1204 of the method comprises spatially modulating light in accordance with the hologram to form the wavefront. This step comprises illuminating the spatial light modulator 800 with a coherent light source (in this example, one or more lasers). The coherent light will be encoded with the hologram to form a holographic wavefront.

Step 1206 of the method comprises forming a holographic reconstruction 822 of the picture by focusing the holographic wavefront towards a front focal plane 812 of a first lens 802. As described in more detail below, in relation to the embodiment of FIG. 13, the exact plane at which the holographic reconstruction is in complete focus may vary, but will generally be substantially at or adjacent to the front focal plane 812 of the first lens 802. The holographic reconstruction 822 of the picture comprises pixels 824.

Step 1208 of the method comprises applying a phase-delay to each pixel of the holographic reconstruction 822 using the kinoform 820 disposed between the first lens 802 and the second lens 804. The zones 826 of the kinoform 820 are arranged to apply a phase-delay to each pixel that is different to the phase-delay of the adjacent pixels. As described above, in one example, there are a discrete number of (e.g. four) different phase-delay values that are applied to the pixels.

Step 1210 of the method comprises moving the kinoform 822 with respect to the holographic reconstruction 822. In this way, different zones 826 of the kinoform 822 are aligned with different pixels of the holographic reconstruction 822 over time. Thus, each pixel of the holographic reconstruction has a plurality of different phase-delays applied thereto. The kinoform 822 is moved (between a first position and a second position) rapidly (for example, at a frequency of 1 kHz). In this way, the phase-delay for each pixel of the holographic reconstruction is changed a plurality of times within the integration time of the human eye. This changes the speckle pattern formed a plurality of times within the integration time of the human high such that the speckle pattern is averaged by the optic system (e.g. eye of a human observer). Thus, the appearance/perception of speckle in the holographic reconstruction is reduced.

Step 1212 of the method comprises receiving light of the modified holographic reconstruction from the kinoform using the second lens. Step 1212 further coupling the modified wavefront into a waveguide having a pair of opposing surfaces arranged to waveguide therebetween, wherein a first surface of the pair of opposing surfaces is partially-reflective partially-transmissive such that a plurality of replicas of the modified holographic wavefront are emitted therefrom.

Figure 13:
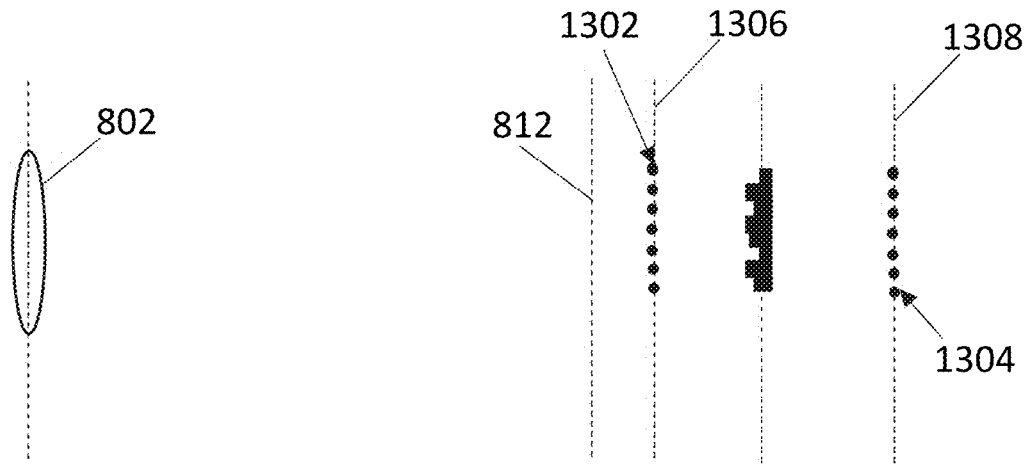
FIG. 13 shows a portion of a holographic projector according to the present disclosure.

FIG. 13 shows a portion of a further embodiment of the holographic projector according to the present disclosure. This further embodiment is very similar to the embodiment of FIG. 8 and like features are numbered accordingly. The main difference between the two embodiments is that holographic projector of this further embodiment is arranged to display a first virtual image viewable from the eye-box at a first virtual image distance and a second virtual image viewable from the eye-box at a second virtual image distance. In this example, the first virtual image distance is 1.5 meters and the second virtual image distance is 25 meters.

The holographic reconstruction of the embodiment of FIG. 13 comprises a first portion 1302 associated with the first virtual image and a second portion 1304 associated with the second virtual image. The first portion 1302 of the holographic reconstruction is focused at a first plane 1306 and the second portion 1304 of the holographic reconstruction is focused at a second plane 1308. As will be well understood by the skilled person, the exact position where the (intermediate) holographic reconstruction is in focus between the first and second lens depends on the corresponding virtual image distance of the virtual image. In particular, the shorter the virtual image distance, the further the holographic reconstruction will be in focus from the first lens 802 (and the closer it will be to the second lens, not shown in FIG. 13). If the virtual image distance is at infinity, the holographic reconstruction will be formed/in complete focus at the front focal plane 812 of the first lens 802. In this example, the first virtual image distance is less than the second virtual image distance and so the first portion 1302 of the holographic reconstruction is closer to the front focal plane 812 of the first lens 802 than the second portion 1304 of the holographic reconstruction; but both virtual image distances are non-infinite and so the first and second portions 1302, 1304 are not exactly at the front focal plane 812.

The inventors have found that the despeckling effect of the kinoform is maximized/optimized when the kinoform is disposed exactly at a plane of the holographic reconstruction (in complete focus). However, in the example shown in FIG. 13, the holographic reconstruction comprises two portions which are completely focused at two different places. In such cases, the inventors have found that it is advantageous to position the kinoform between the first plane 1306 and the second plane 1308 so that a despeckling effect is achieved at all depths. In particular, and as shown in FIG. 13, the inventors have found that it is advantageous to position the kinoform 820 at the midpoint between the first and second planes 1306,1308.

The holographic projector of FIG. 13 is described as being arranged to form two virtual images at 1.5 meters and 25 meters respectively. This is merely exemplary. The kinoform may be used to reduce the speckle effect at any arbitrary distance of a virtual image and for any number of virtual images at any arbitrary distance. In each case, it is advantageous for the kinoform to be placed at an average position/mid-point between the planes formed by the plurality of portions of holographic reconstructions.

Modified Speckle Reduction

As described above, the kinoform 820 is rapidly moved between a first and second position to cause a plurality of different speckle patterns to be moved. Doing so within the integration time of the human reduces the appearance of speckle. Kinoform 820 comprises zones 826. Each pixel 824 of a holographic reconstruction is aligned with one zone 826 (for example, in the first position). Because the pixels 824 (shown in FIGS. 9 and 11) are in a uniform, regular, square array (e.g. are evenly spaced), the zones 826 of the kinoform 820 also form a uniform, regular, square array. Furthermore the pixels 824 shown in FIGS. 9 and 11 are relatively small. This means that it is relatively straightforward to have each pixel 824 of the holographic reconstruction aligned with (only) one zone simultaneously (e.g. in the first or second position of the kinoform 820). However, this is not always the case.

Figure 14:
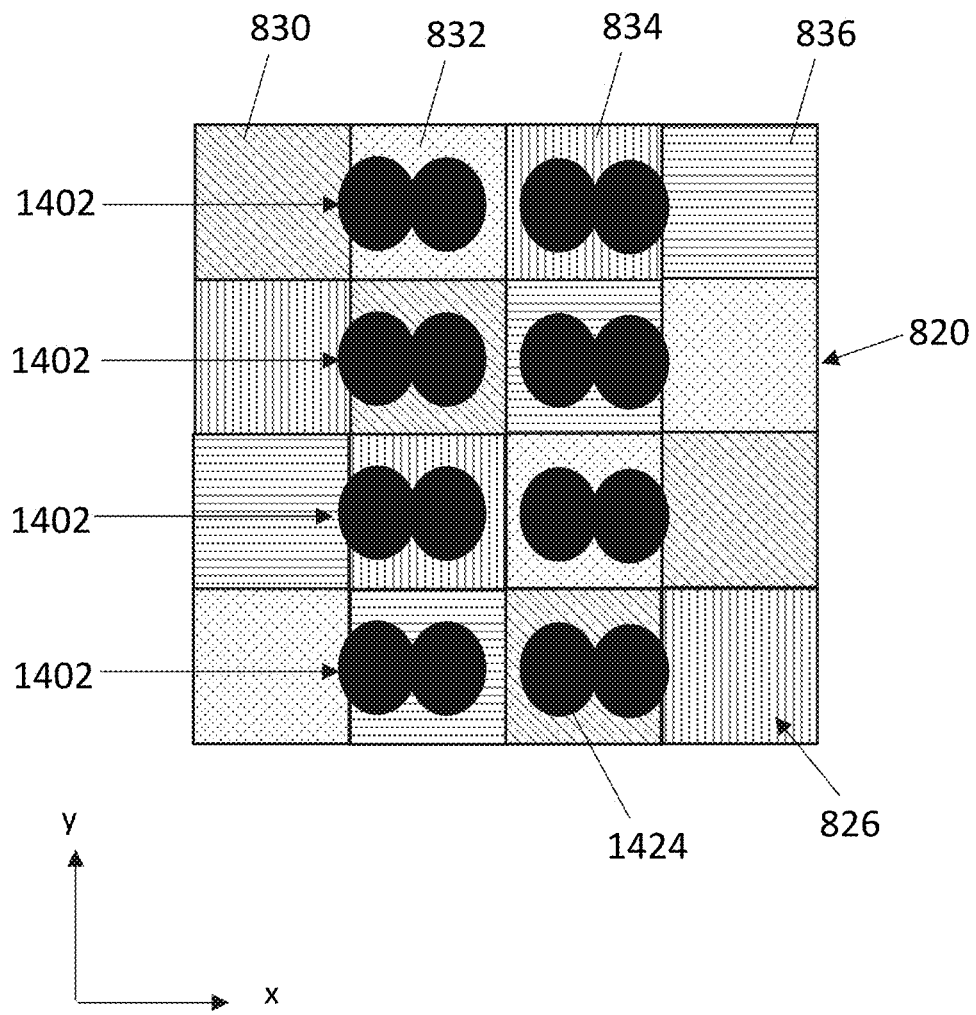
FIG. 14 shows a front view of a portion of the kinoform of FIG. 9 with pixels of a second (pre-distorted) holographic reconstruction superimposed thereon.

FIG. 14 shows pixels 1424 of a second holographic reconstruction. The pixels 1424 of the second holographic reconstruction are relatively much larger than the pixels 824. Furthermore, the pixels 1424 do not form a uniform/regular array.

Herein, a horizontal direction (x-direction) will be referred to as a first direction and a vertical direction (y-direction), that is perpendicular to the first direction, will be referred to as a second direction. There are four lines 1402 of pixels. The four lines 1402 of pixels extend in the first direction (i.e. are horizontal/are in the x-direction). A pitch of the pixels in each of the four lines 1402 (i.e. a distance between the centre of adjacent pixels) in the first direction is less than a corresponding pitch of the pixels 824 of the first holographic reconstruction. In other words, the pitch in the first direction has generally been reduced in the second holographic reconstruction. Furthermore, the pitch of pixels in the first direction of each of the four lines 1402 varies along the first direction. In particular, the pitch is largest between the two middle pixels 1424 of each line such that the two middle pixels 1424 do not overlap. The two outer pixels is smaller such that the two outer pixels do overlap with their adjacent pixels (on either side of the middle pixels).

As described previously, the reason for the reduction in, and changing, pixel pitch in the second holographic reconstruction is to compensate for the magnification of an optical component. In particular, the holographic projector is arranged to relay a holographic wavefront to an eye-box via an optical combiner which, in this example is a windscreen or windshield. The eye-box and optical combiner are not shown in the drawings. The optical combiner has a non-uniform optical power. In this example, the optical power of the optical combiner is greater in the first direction than in the second direction. Furthermore, the optical power of the optical combiner varies along the first direction. In this example, the optical power of the optical combiner is greater at the edges and less in the middle along the first direction. This is because the curvature of the optical combiner is generally greater in first direction than the second direction and because the optical combiner has a complex curve shape which increases with distance from the centre, along the first direction. The complex curve shape results in non-uniform magnification (e.g. distortion/warping) of the image viewable at the eye box relative to the holographic reconstruction at the plane of the kinoform. By pre-distorting the holographic reconstruction, this distortion/warping can be compensated for such that the image viewable from the eye-box appears as intended. In the example of FIG. 14, the pixels 1424 have been pre-distorted/repositioned in such a way that, when the holographic wavefront is distorted by the optical combiner, an image comprising a regular array of pixels (resembling that of FIG. 11) is viewable from the eye box. Such a pre-distortion process will be familiar to the skilled reader.

FIG. 14 shows how the pixels 1424 interact with a portion of kinoform 820. In particular, FIG. 14 shows how it is no longer the case that each pixel is aligned with a single zone 826 of the kinoform. For example, outer pixels 1426 are aligned with two zones 826 each, such that a different phase delay is simultaneously applied to different portions of each of these outer pixels 1426. The inventors have found that this overlapping of zones 826 by the pixels 1424 may adversely affect the quality/clarity of a holographic projection and so have provided an alternative (second) example of kinoform 1520 which is described herein.

Figure 15:
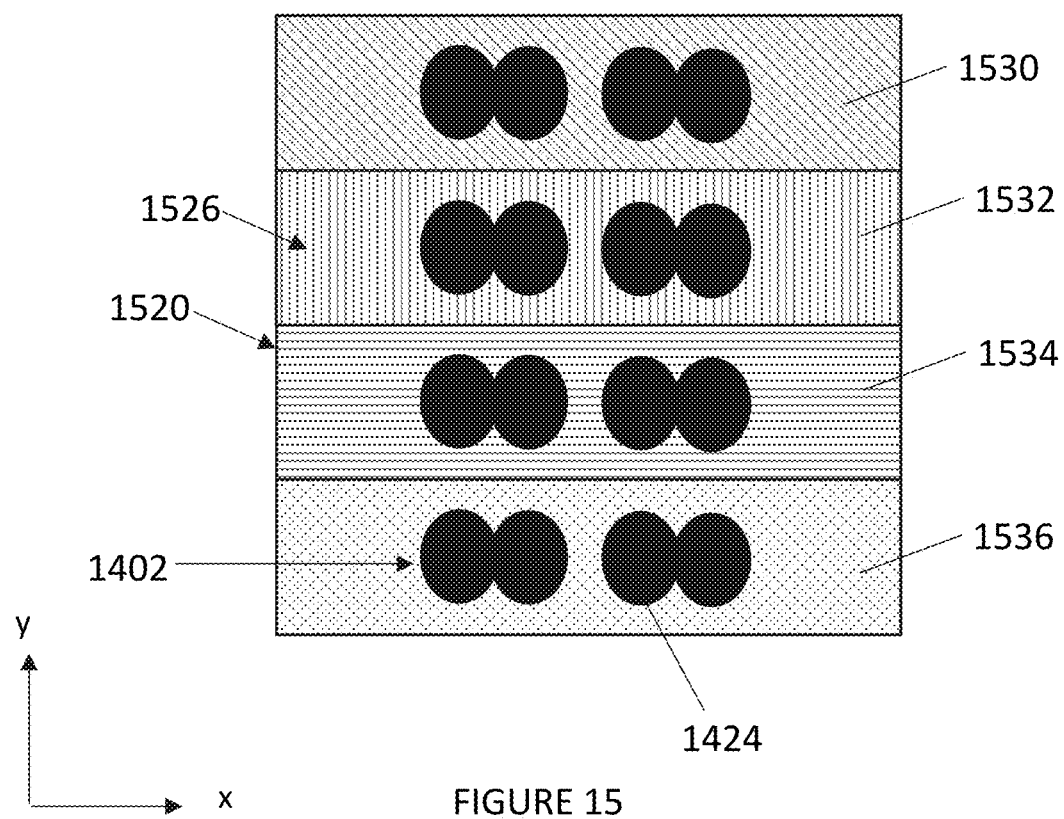
FIG. 15 shows a front view of a portion of an example of a striped kinoform, showing pixel of the second holographic reconstruction superimposed thereon.

FIG. 15 shows a portion of a second kinoform 1520. The kinoform 1520 comprises a one dimensional array of four discrete zones 1526. Each zone 1526 extends in the first direction and, in this example, extends along the full length of the kinoform 1520. The zones 1526 may be described as forming stripes extending in the first direction such that the kinoform 1520 may be referred to as a striped kinoform. Because the zones 1526 extend as stripes along the first direction, the risk of an overlap or misalignment of pixels 1424 with any particular zone in the first direction is mitigated. Each pixel 1424 within a single line 1402 is aligned with the same zone (along the first direction) but adjacent lines are aligned with different (but adjacent) zones.

Each zone 1526 of the kinoform 1520 is arranged to apply a phase delay having one of four (different) allowable or discrete values. The different phase delays are represented by the different shading of the zones in FIG. 15. In particular, a first phase-delay value is represented by the diagonal shading in a first zone 1530; a second phase-delay value is represented by the vertical shading in a second zone 1532; a third phase-delay is represented by the horizontal shading in a third zone 1534; and a fourth phase-delay is represented by the dotted shading in a fourth zone 1536. Each of the first to fourth phase-delays are between 0 and pi radians.

Figure 16:
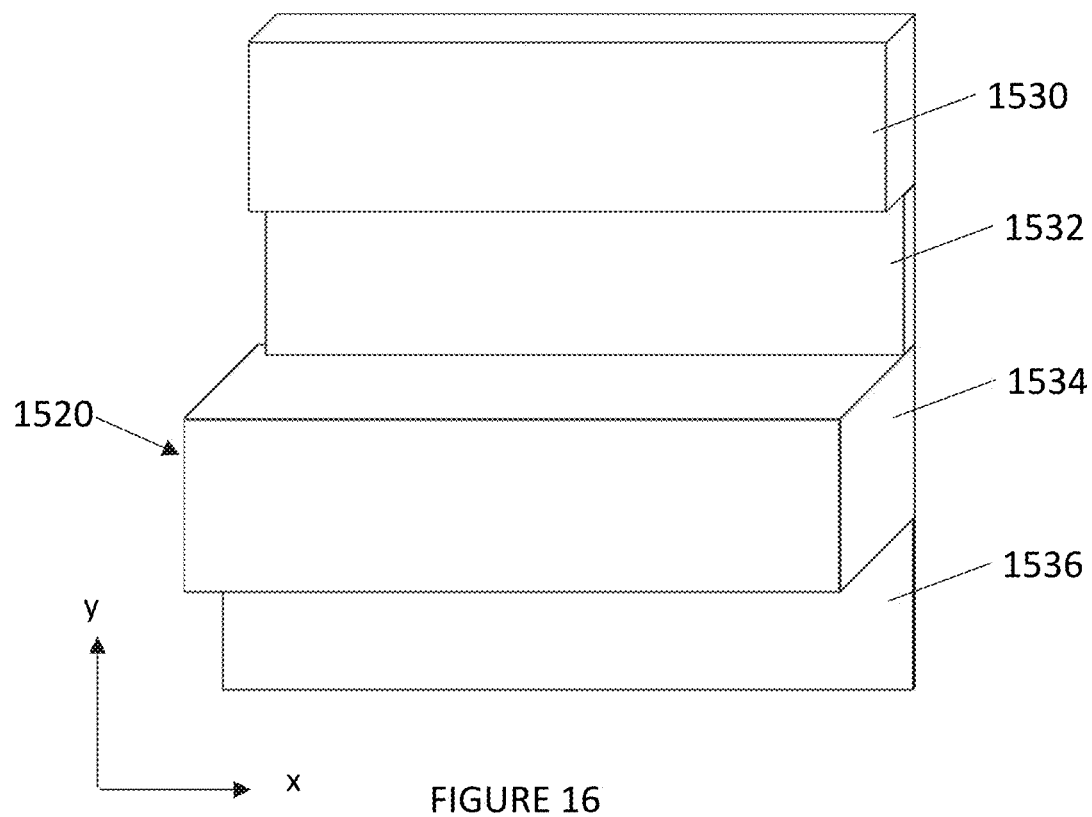
FIG. 16 shows a perspective view of the portion of the striped kinoform of FIG. 15.

In some examples, the amount of phase-delay applied by the kinoform 1520 to each pixel is dependent on the thickness of the kinoform in a particular zone. In such embodiments, the kinoform 1520 comprises a transparent material such as glass or quartz having a refractive index greater than 1. Thus, light propagates more slowly through the kinoform 1520 than through air and so the phase-delay applied to light associated with each pixel will increase with increasing thickness. FIG. 16 is a perspective view of the kinoform 1520 showing how each zone 1526 has a thickness and how zones of the same type (i.e. zones arranged to apply the same phase-delay) have the same thickness. In particular, there are four different thicknesses of zones and these correspond to the same order as the zones shown in FIG. 15.

By moving the kinoform 1520 in the second direction (i.e. perpendicularly to the first direction), different lines of pixels are brought into aligned with different zones such that the relative phase difference between adjacent pixels of adjacent lines changes. This changes the speckle pattern of the image formed at the viewing system. This is because the relative phase of the light associated with adjacent pixels between adjacent lines is changed and so the interference pattern (e.g. shown, for example, in FIG. 7B) is also changed. The inventors have found that, even though relative phase between pixels is only changed in the second direction (rather than changing for all pairs of adjacent pixels, as in FIG. 9 etc.), the change in the interference pattern is substantial enough to meaningfully reduce the speckle effect. The inventors have recognised that this can be achieved a risk of degrading image quality/sharpness.

Figure 17B:
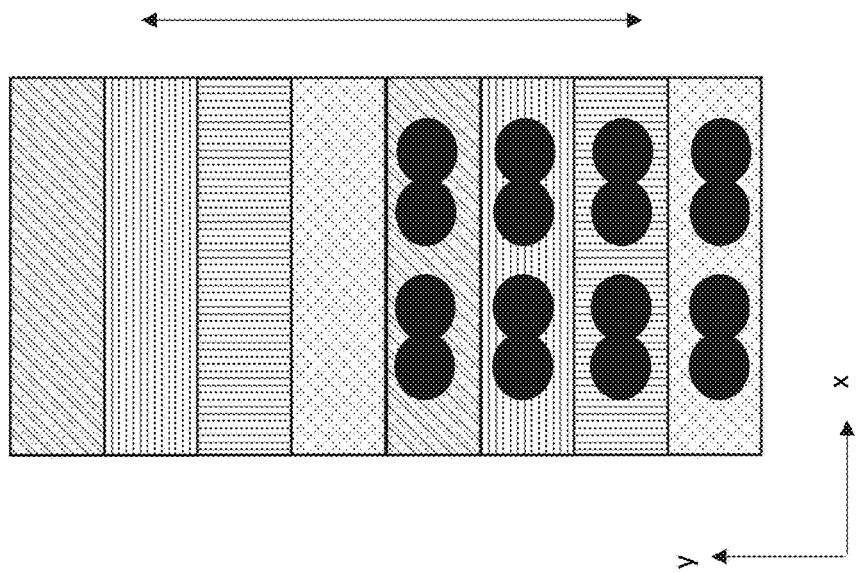
FIG. 17B shows a front view of the larger portion of the striped kinoform of FIG. 17A shown in a second position relative to the second holographic reconstruction.
Figure 17A:
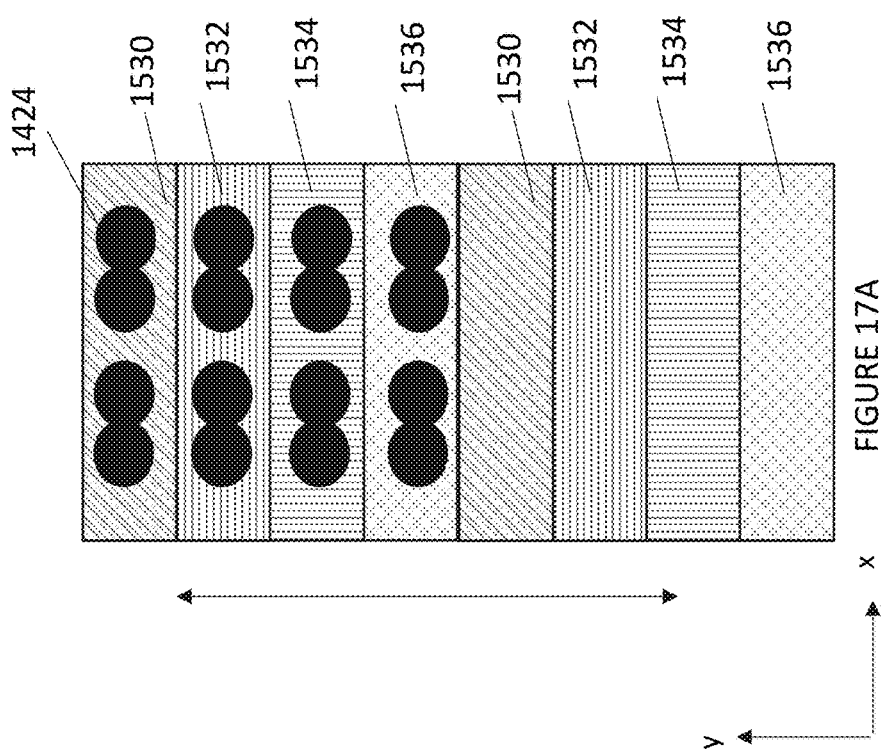
FIG. 17A shows a front view of a larger portion of the striped kinoform of FIGS. 14 and 15 shown in a first position relative to the second holographic reconstruction.

FIGS. 17A and 17B show a larger portion of the kinoform 1520 than shown in FIGS. 14 and 15. In particular, FIGS. 17A and 17B show that the kinoform comprises more zones than the holographic reconstruction comprises lines of pixels. This means that there are some zones of the kinoform which are not aligned with a pixel in each position. FIGS. 17A and 17B show that the first position and second position are separated be a distance of four zones (but this is merely optional, other distances between the first and second position are possible). FIGS. 17A and 17B show that, in the second position, each zone of the kinoform is substantially aligned with a different line of pixels of the holographic reconstruction to the pixel of the first position. It should be clear, that as the kinoform is moved from the first position to the second position (with respect to the holographic reconstruction) each pixel of the holographic reconstruction will be aligned with one of four different zones and so have four different phase-delays applied. At all times, the phase-delay applied to adjacent pixels of adjacent lines is different—but pixels within a will have the same phase-delay applied. So, as the kinoform is moved, four different speckle patterns will be formed at the viewing system.

The example of the second kinoform 1520 and the second holographic reconstruction are schematic and exemplary only. For example, a four by four array of pixels 1424 is shown in the figures. However, it should be clear that, typically, the holographic reconstruction will comprise many more pixels, for example 1 or 2 megapixels. Furthermore, because only a few pixels are shown in the Figures, the reduced and varying pitch of the pixels 1424 in the first direction has been exaggerated Optimised Configurations for Rotation United Kingdom patent application publication no. 2626174 discloses a component (e.g. despeckling component or kinoform) which can be used for despeckling by placing it at an intermediate image plane and translating it perpendicular to the optical axis if the system. The pattern of this component is designed such that it disrupts the interference between adjacent image pixels while maintaining the phase within a single image pixel, thereby enabling high image quality over a range of content depths.

However, moving in a linear manner means that there is a time when the despeckling component must turn around and is therefore moving slowly. This turn around means that fewer different phase states of the despeckler are accessible and the interference between adjacent pixels is not disrupted or is disrupted more weakly, leading to an increase in laser speckle during the turn around time of the despeckling component. Therefore, while laser speckle is reduced there is a limit to the effectiveness of despeckling due to the linear driving of the component. Increasing the frequency of the linear motion leads to undesirable audible noise while increasing the amplitude leads to a larger size and higher power consumption.

One method of some embodiments to eliminate the turn around of the despeckling component is to move to a continuous circular drive motion, such as may be applied by mounting the component on the drive shaft of a motor. However, if the pattern previously used when driving in a linear motion is applied to a circular drive motion then the performance is reduced. This is illustrated with reference to FIGS. 18 and 19.

Figure 18:
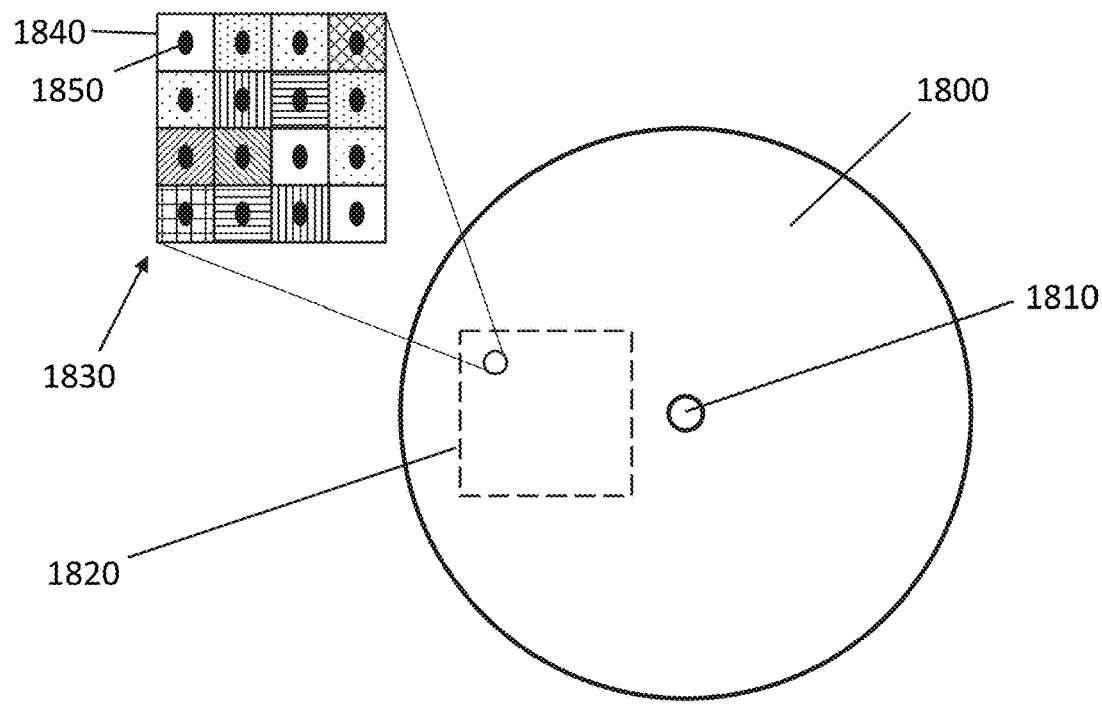
FIG. 18 shows a square array of square phase-delay areas in optimal orientation.

FIG. 18 shows a kinoform 1800 arranged for rotation about a centre 1810. An expanded view of a portion 1820 of the kinoform 1800 is shown to illustrate the structure of the kinoform in relation to the image pixels (or, at least, the image pixel positions) of the holographic reconstruction (or "image"). The expanded view shows a 4×4 array of phase-delay areas 1830 (also referred to herein as "phase zones") such as first phase-delay area 1840. Each phase-delay area is square or at least quadrilateral. FIG. 18 also shows a regular, square array of 4×4 image pixels such as first image pixel 1850. Each image pixel is circular or elliptical. FIG. 18 shows an image pixel is formed in the centre of each phase-delay area. The array of phase-delay areas and image pixels are coordinated in this orientation of the kinoform. However, this coordination may be disrupted by rotation of the kinoform.

FIG. 18 shows the component in its optimal orientation, with the orientation of the pattern aligned with the orientation of the image pixels at the intermediate image plane. By design, there is at most one image pixel within a given phase zone. However, at some time later the component (i.e. the kinoform) will have rotated by 45° into the orientation shown in FIG. 19.

Figure 19:
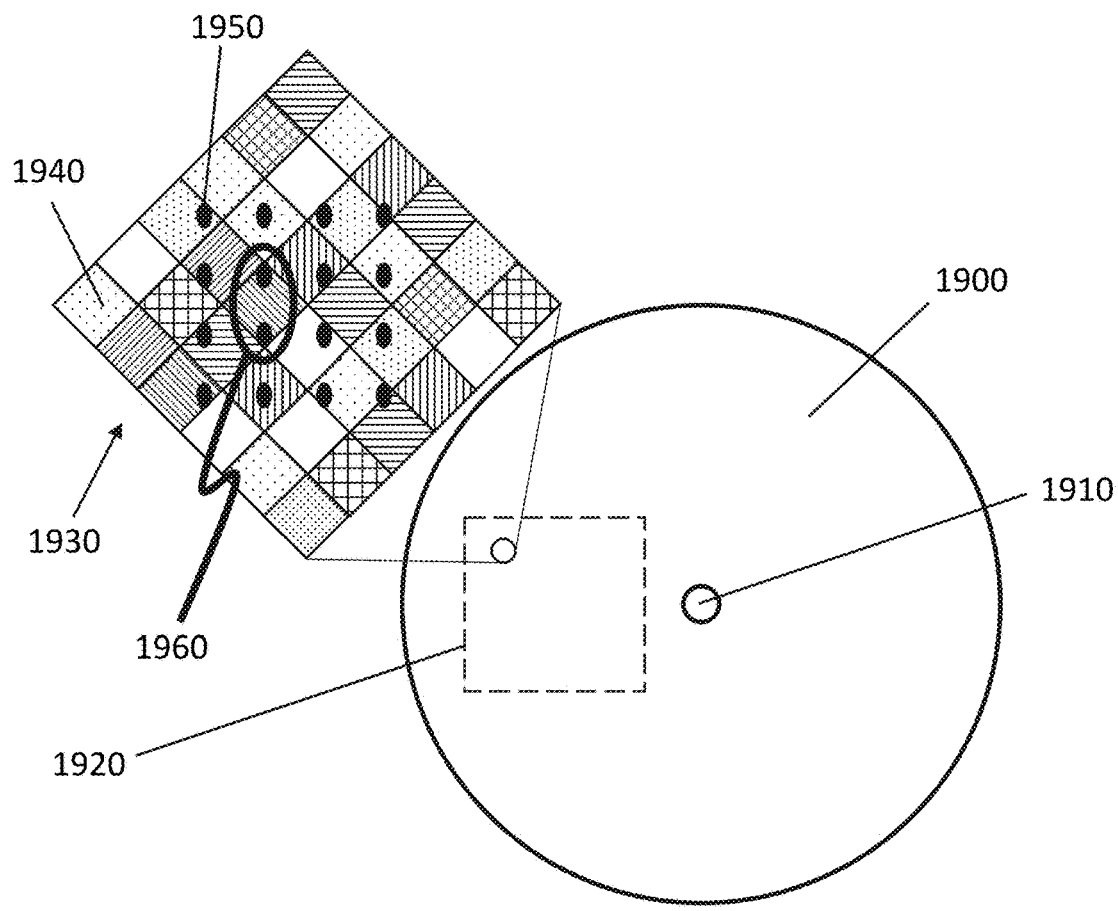
FIG. 19 shows a square array of square phase-delay areas in a sub-optimal orientation.

FIG. 19 shows a kinoform 1900 arranged for rotation about a centre 1910. An expanded view of a portion 1920 of the kinoform 1900 is shown to illustrate the structure of the kinoform in relation to the image pixels (or, at least, the image pixel positions) of the holographic reconstruction (or "image"). The expanded view shows a 6×6 array of phase-delay areas 1830 ("phase zones") such as first phase-delay area 1940. Each phase-delay area is still square or at least quadrilateral—but the array is globally rotated. The array of phase-delay areas of FIG. 19 is rotated 45 degrees counter-clockwise compared to the array of phase-delay areas of FIG. 18. FIG. 19 shows the 4×4 array of image pixels, such as first image pixel 1950, of FIG. 18. Each image pixel is circular or elliptical. The array of image pixels is not rotated by 45 degrees compared to FIG. 18 because only the kinoform is rotating. FIG. 19 shows that the 1:1 alignment of image pixels to phase zones is disrupted by the rotation of the array of phase zones. The array of phase-delay areas and image pixels are not coordinated in this orientation of the kinoform.

With the pattern misaligned relative to the image pixels, there are positions where two spots share a single phase zone (see, for example, the pair of pixels 1960 of FIG. 19) and the interaction between the two spots (or pixel positions) is constant for a period of time. The effect of this is similar to that caused by having a turn around time, where the amount of speckle reduction is not constant with time, and the higher speckle at certain times is perceptible by a viewer and degrades the overall image quality. A regular square array of phase zones and a square array of image pixel positions may therefore be sub-optimal for a rotating kinoform.

An improvement on the pattern shown in FIGS. 18 and 19 is achieved by increasing the rotational order of symmetry of the phase zones. For example, a regular array of hexagons (FIG. 20) may be used instead of squares.

Figure 20:
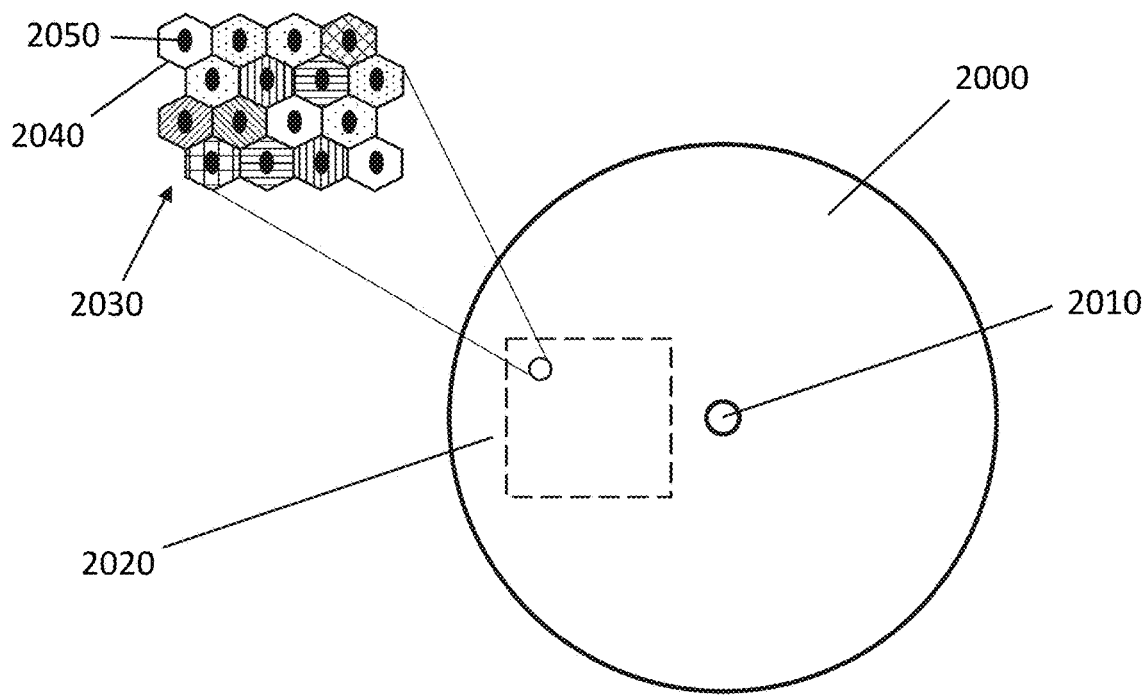
FIG. 20 shows hexagonal array of hexagonal phase-delay areas optimised for rotation.

FIG. 20 shows a kinoform 2000 arranged for rotation about a centre 2010. An expanded view of a portion 2020 of the kinoform 2000 is shown to illustrate the structure of the kinoform in relation to the image pixels (or, at least, the image pixel positions) of the holographic reconstruction (or "image"). The expanded view shows a 4×4 array of phase-delay areas 2030 ("phase zones") such as first phase-delay area 2040. Each phase-delay area is hexagonal and the phase-delay elements are closed-packed in a regular hexagonal array that will be familiar to the reader. Alternate rows of phase zones are offset in horizontal direction of the figure in accordance with the hexagonal packing arrangement. For example, the image pixels of the even rows are vertically aligned with the gaps between the image pixels of the adjacent, odd rows. FIG. 20 shows a corresponding 4×4 array of image pixels, such as first image pixel 2050. Each image pixel is circular or elliptical. FIG. 20 shows a 1:1 alignment of image pixels to phase zones. The array of phase-delay areas and image pixels are coordinated in this configuration. The image pixels are therefore also arranged in a hexagonal array. This may be achieved by a variety of different methods. For example, this may be achieved by known methods of modifying the hologram calculation or known methods of interlacing together two different holographic reconstructions using a phase-ramp offset for one of the holographic reconstructions.

In relation to FIG. 20, the difference between the optimum orientation and the maximum misalignment, occurring at n×30° (where n is an integer) is reduced, resulting in improved despeckling performance. As explained above, to use such a pattern requires that the arrangement of (image) pixels be adjusted. The distance between adjacent pixels is not changed, and therefore this does not affect image quality, but may be undesirable for other reasons such as having to resample input image data onto the non-square pixel pattern.

Figure 21:
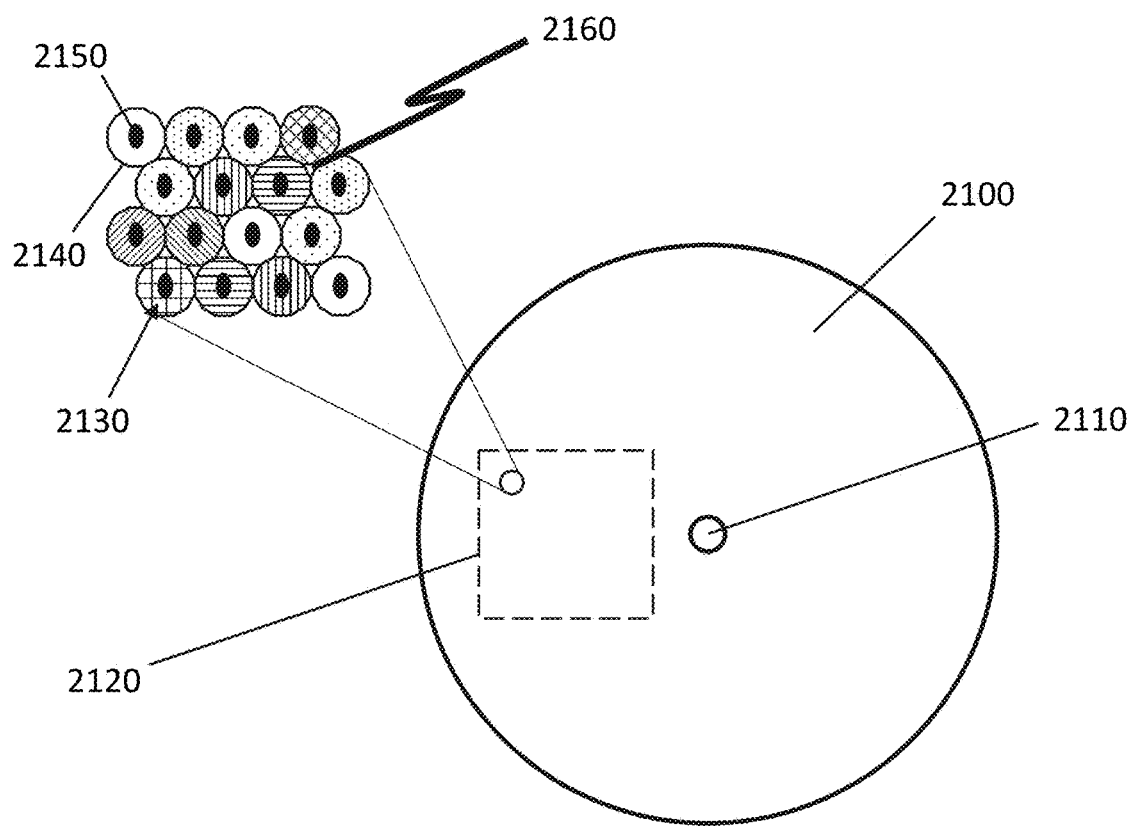
FIG. 21 shows a hexagonal array of dodecagonal phase-delay areas optimised for rotation.

There is no single shape with higher rotational symmetry than a hexagon which can tile a plane, but semiregular tiling patterns, such as that composed of dodecagons and triangles shown in FIG. 21, may be used.

FIG. 21 shows a kinoform 2100 arranged for rotation about a centre 2110. An expanded view of a portion 2120 of the kinoform 2100 is shown to illustrate the structure of the kinoform in relation to the image pixels (or, at least, the image pixel positions) of the holographic reconstruction (or "image"). The expanded view shows a 4×4 array of phase-delay areas 2130 ("phase zones") such as first phase-delay area 2140. Each phase-delay area has a dodecagonal shape and the phase-delay elements are closed-packed in a regular array similar to that of FIG. 20. Alternate rows of phase zones are offset in horizontal direction of the figure in accordance with the close-packing arrangement. For example, the image pixels of the even rows are vertically aligned with the gaps between the image pixels of the adjacent, odd rows. FIG. 21 shows a corresponding 4×4 array of image pixels, such as image pixel 2150. Each image pixel is circular or elliptical. FIG. 10 also shows a 1:1 alignment of image pixels to phase zones. The array of phase-delay areas and image pixels are coordinated in this configuration. The image pixels are therefore also arranged in a substantially hexagonal array. Again, this may be achieved by a variety of different methods as explained above. Each dodecagon (e.g. first image pixel 2150) has a random phase (more specifically, phase-delay), while each triangle (e.g. first triangle 2160) may have either a random phase (or phase delay) or all triangles may share the same phase (or phase delay).

Figure 22:
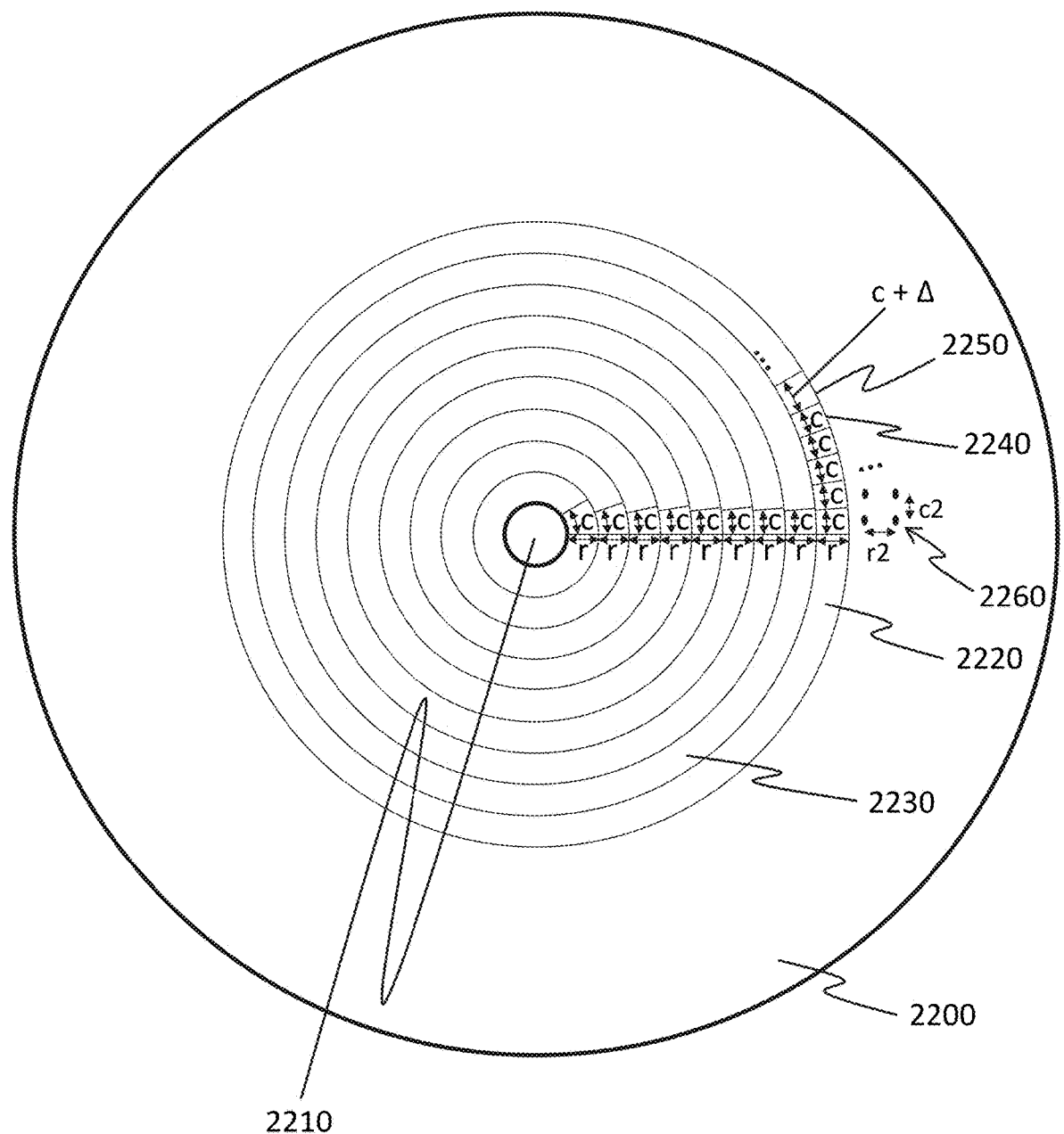
FIG. 22 shows a first example comprising concentric rings of evenly spaced phase-delay areas.

In an example, the irregular pattern of FIG. 22 achieves improved despeckling performance. In overview, the radial zones are each separated by the image pixel pitch of the pixel pattern in the radial direction. Each radial zone is further split up into zones circumferentially, each of which has a minimum edge length equal to the image pixel pitch of the content in the circumferential direction. Because it is not necessarily the case that an integer number of circumferential zones will fit into a given radial zone, either the circumferential length of each phase zone may be increased by a small amount (the example of FIG. 22) or a single circumferentially larger phase zone may be included within the pattern to accommodate the extra length (the example of FIG. 23).

FIG. 22 shows an example comprising a kinoform 2200 arranged for rotation about a centre 2210. The kinoform is divided into a plurality of concentric zones, such as a first concentric zone 2220 and a second concentric zones 2230, that are concentric about the centre 2210 of the kinoform 2200. Each concentric zone is sub-divided into a plurality of circumferential zones. Each circumferential zone has a respective phase-delay that is different to all its neighbours. Each circumferential zone is therefore a phase-delay area as per the examples described above. FIG. 22 shows a plurality of phase-delay areas of the first concentric zone 2220 such as first phase-delay area 2240. In an example, all phase-delay areas of all concentric zones have the same first dimension, r, in the radial dimension and the same second dimension, c, in the circumferential direction. In the example of FIG. 22, there is an exception which is the second phase-delay area 2250 of the first concentric zone 2220. The second phase-delay area 2250 has the same first dimension, r, of the other phase-delay areas of the first concentric zone 2220. However, the second phase-delay area 2250 has a longer second dimension, $c+\Delta$, where $\Delta$ is less than c. In an example, there is one larger circumferential zone in each radial zone. Each circumferential zone has a different pseudo-random phase-delay—that is, different to at least all its immediate (e.g. adjoining) neighbours.

FIG. 22 also shows a subset of the pixel positions 2260 of the corresponding (light) pixel pattern of the holographic reconstruction. The pixel positions of the (light) pixel pattern have a first periodicity (radial image pixel pitch) of r2 in the radial direction and a second periodicity (circumferential image pixel pitch) of c2 in the circumferential direction.

In an example, r=r2 and c=c2. In an example, $\Delta$<c and $n \times c + \Delta = A$, wherein A is an integer and n is the number of circumferential zones of the corresponding radial zone.

Figure 23:
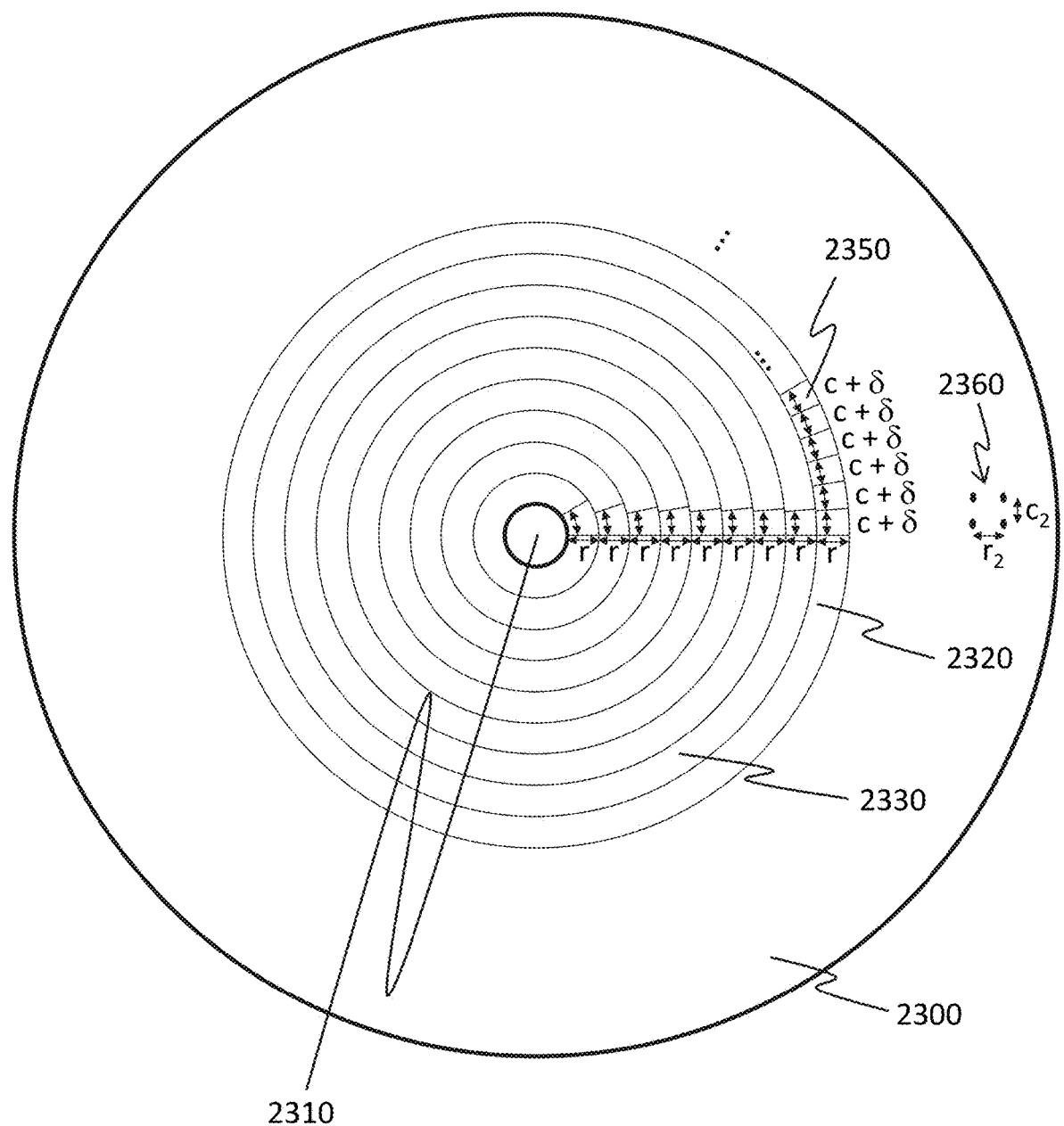
FIG. 23 shows a second example comprising concentric rings of evenly spaced phase-delay areas.

FIG. 23 shows another example comprising a kinoform 2300 arranged for rotation about a centre 2310. The kinoform is divided into a plurality of concentric zones, such as a first concentric zone 2320 and a second concentric zones 2330, that are concentric about the centre 2310 of the kinoform 2300. Each concentric zone is sub-divided into a plurality of circumferential zones. Each circumferential zone has a respective phase-delay that is different to all its neighbours. Each circumferential zone is therefore a phase-delay area as per the examples described above. FIG. 23 shows a plurality of phase-delay areas of the first concentric zone 2320 such as first phase-delay area 2350. In an example, all phase-delay areas of all concentric zones have the same first dimension, r, in the radial dimension. In this example, the phase-delay areas of the first concentric zone 2320 have a second dimension, $c+\delta$, in the circumferential direction. The phase-delay areas of the other concentric zones may have a second dimension of c in the circumferential direction. The second phase-delay areas, such as first phase-delay area 2350, have a longer second dimension, $c+\delta$, where $\delta$ is much less than c. Each circumferential zone has a different pseudo-random phase-delay—that is, different to at least all its immediate (e.g. adjoining) neighbours.

FIG. 23 also shows a subset of the pixel positions 2360 of the corresponding (light) pixel pattern of the holographic reconstruction. The pixel positions of the (light) pixel pattern have a first periodicity (radial image pixel pitch) of r2 in the radial direction and a second periodicity (circumferential image pixel pitch) of c2 in the circumferential direction.

In this example, r=r2 and c=c2. In an example, $\delta \ll c$ and $n \times (c+\delta) = B$, wherein B is an integer and n is the number of circumferential zones of the corresponding radial zone. In this example, all circumferential phase zones in a given radial phase zone are the same size.

The kinoform/despeckling component of the present disclosure may be made of glass and manufactured in a direct write photolithography and dry etch process, for example. The kinoform/despeckling component may be made of polymer on glass and the different phase zones manufactured in the polymer via a nanoimprint process, for example.

Aspects of the comparative examples described above in relation to FIGS. 8 to 23 may be combined with the embodiments of the present disclosure as described below.

Luminance Loss with Prior Diffusers

A further method of speckle reduction is to use a diffuser—that is a diffuse surface that scatters light. Contrary to the kinoforms described above, diffusers are (primarily) used in "hologram-to-image" or "hologram-to-diffuser" display systems, in which the holographic light is formed on a diffuser to produce light in the image domain, which is then replicated and relayed to the user. Such a diffuser is arranged at an image plane of the display system of which it is part. As described above, the diffuser is moved within the integration speed of the human eye. FIGS. 24A to 25C show such a diffuser 2400 according to the prior art. As with the kinoforms 1800, 1900, 2000, 2100, 2200, 2300 described above in relation to FIGS. 18 to 23, the movement of the diffuser 2400 is rotational movement. The diffuser 2400 is spatially uniform in accordance with the prior art.

Figure 24A:
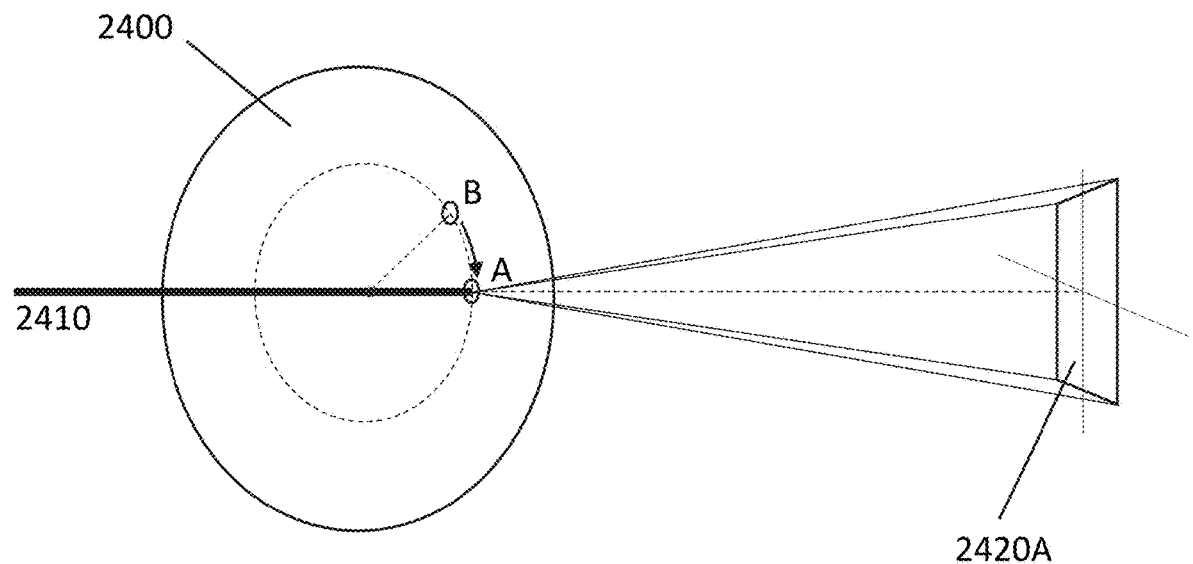
FIG. 24A shows the diffusion profile produced by a beam of light incident on a first point of a diffuser according to the prior art.
Figure 24B:
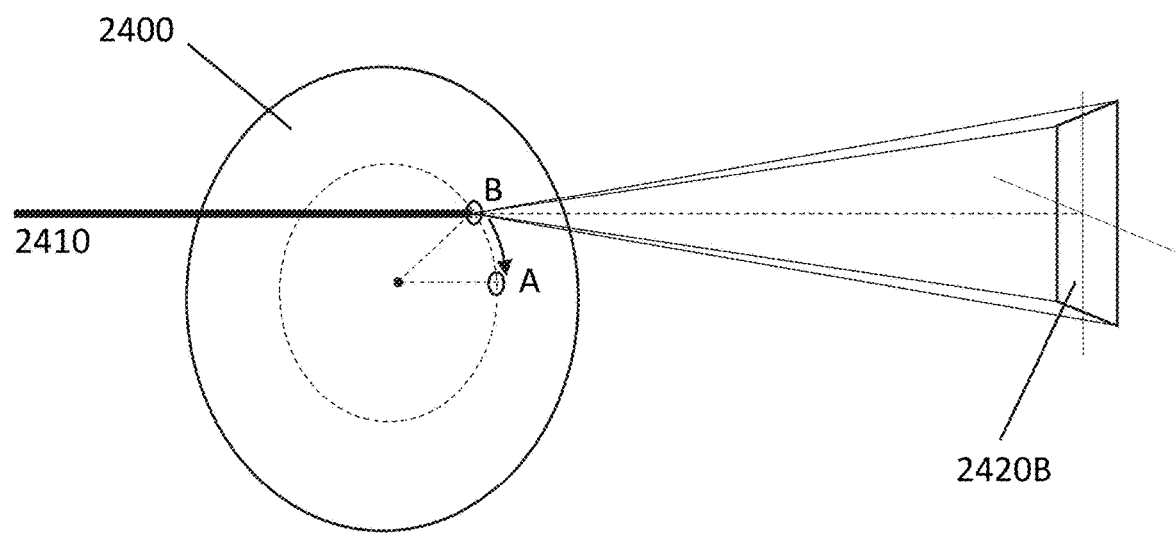
FIG. 24B shows the diffusion profile produced by a beam of light incident on a second point of the diffuser of FIG. 24A.

FIGS. 24A and 24B show a collimated laser beam 2410 incident at two points, A and B, respectively. The points A and B lie on a common arc of the diffuser 2400. In other words, the diffuser 2400 remains in the same location/ orientation in FIGS. 24A and 24B, whilst the laser beam 2410 is moved to be incident on points A and B. The diffuser 2400 has a non-rotationally symmetric flat-top, rectangular angular scattering profile (also referred to herein as a diffusion profile). This rectangular profile is chosen to achieve the most efficient light utilisation, and so maximum luminance, in a head-up display system with a rectangular viewing window (eye-box) and planar replicators (i.e., waveguides, as described above in relation to FIGS. 5A and 5B). The diffuser 2400 is spatially uniform, and so the angular luminance distribution is the same for all points on the diffuser 2400—and specifically for points A and B as shown. That is, the scattering profile 2420A, 2420B produced from points A and B respectively are identical-they have the same size, shape and orientation.

Figure 25A:
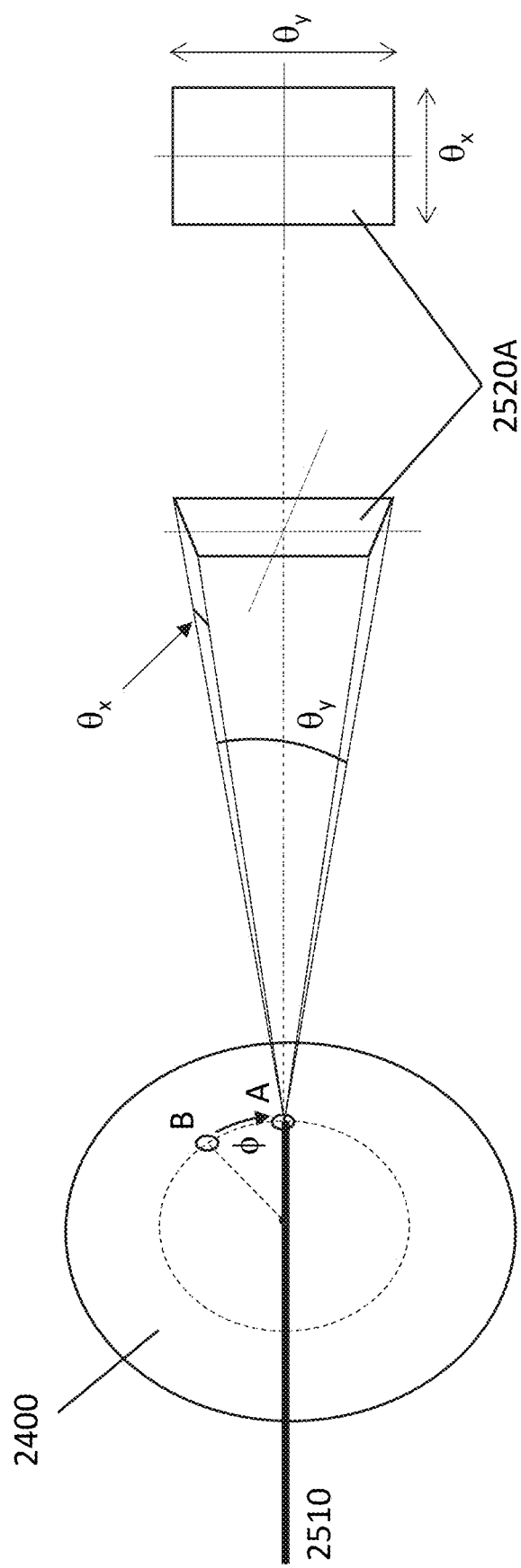
FIG. 25A shows the diffusion profile produced by a beam of light incident on a first point of the diffuser of FIG. 24A in a first position.
Figure 25B:
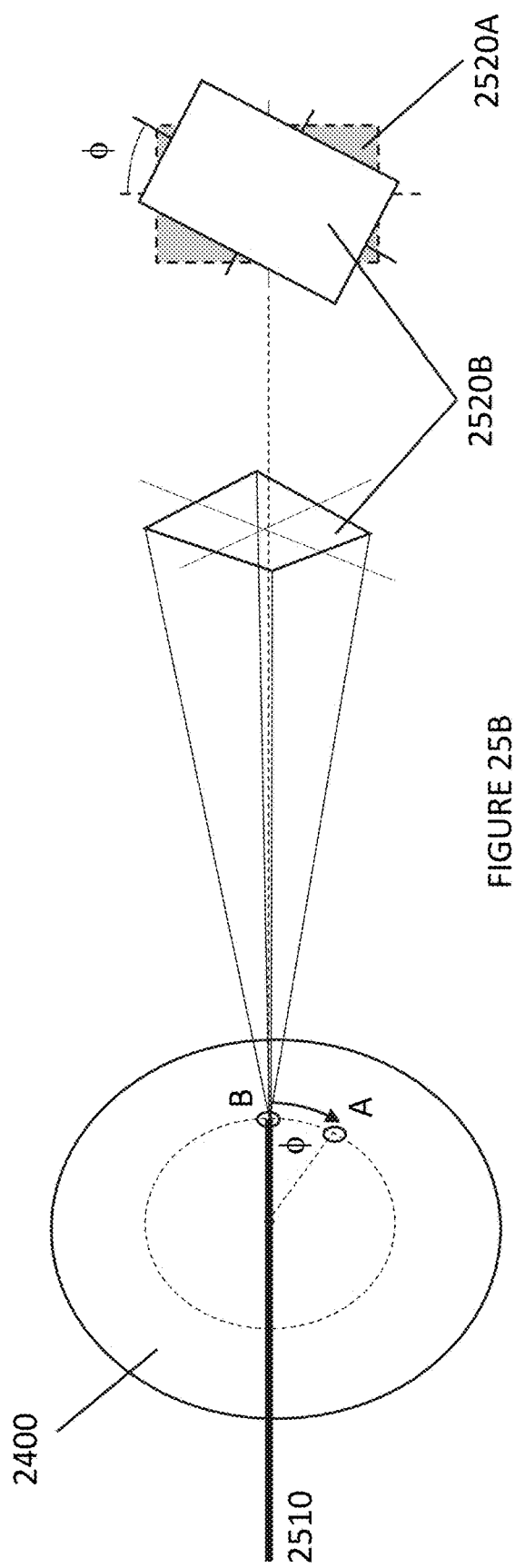
FIG. 25B shows the diffusion profile produced by a beam of light incident on the first point of the diffuser of FIG. 24A in a second position.

FIGS. 25A and 25B show the diffuser 2400 described above illuminated with the same single collimated laser beam 2410 incident on points A and B. However, in these Figures, the laser beam 2410 remains stationary and the diffuser 2400 is rotated about its centre, as it would be in use (as described above). The centre of the diffuser 2400 (and therefore the point of rotation) is coincident with the centre of the arc containing points A and B. The scattering profile 2520A produced from point Δ is the same as the scattering profiles 2420A, 2420B produced from points A and B in FIGS. 24A and 24B and described above. FIG. 25A further shows how the angles of light divergence θx, θy produce the dimensions of the scattering profile 2520A.

As the diffuser 2400 rotates by an angle ϕ, which brings point B to the same position as point A before rotation, the angular scattering profile 2520B also rotates by the same angle ϕ. The scattering profile 2520A produced from point Δ is shown in FIG. 25B for comparison. As such, the optimum rectangular profile required by the display system (the scattering profile 2520A produced from point A) is no longer achieved for all rotation angles of the diffuser 2400. That is, the grey shaded area of the scattering profile 2520A produced from point Δ is missing from the required profile.

Figure 25C:
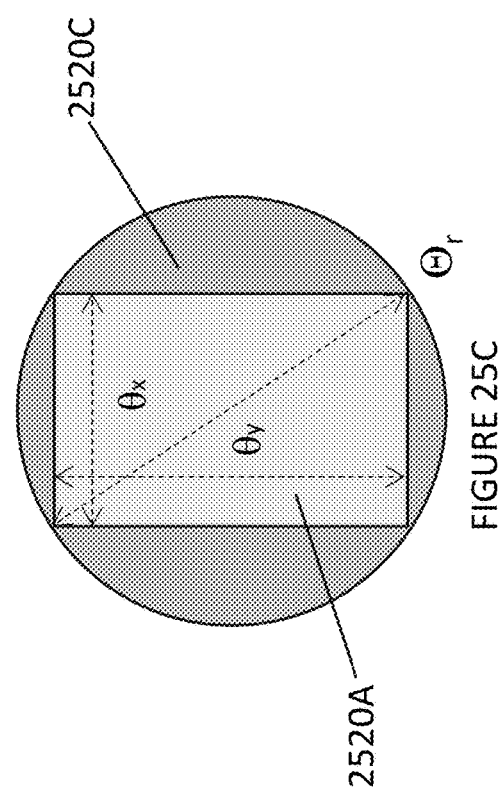
FIG. 25C shows the diffusion profile required for uniform luminance for the diffuser of FIG. 24A.

The amount of area missing from the optimum required profile will vary as the diffuser 2400 rotates. FIG. 25C shows a total scattering profile 2520C through all rotations of the angle ϕ, compared to the optimum rectangular profile 2520A. The total scattering profile 2520C has a diameter Or, which corresponds to the distance between the opposite corners of the optimum rectangular profile 2520A. In other words, the optimum rectangular profile 2520A can still be achieved, despite the rotation of the diffuser 2400, by using the overlap of the scattering profile at each rotation of the angle ϕ. However, the resultant profile, averaged over a complete rotation, will be deficient in luminance at some of the angles required of the ideal profile by the display. Furthermore, given the circular shape of the total scattering profile 2520C, it has been the established practice to use a diffuser with a rotationally symmetric flat-top (i.e., circular) scattering profile. This is because the rectangular profile shown in FIGS. 24A to 25B will create a circular total scattering profile 2520C regardless, due to the rotation of the diffuser 2400 through the angle ϕ, and that such a circular profile may represent an easier shape to manufacture than the rectangular profile. There is, however, still considerable wastage of available light—as seen in the areas of the total scattering profile 2520C outside of the desired rectangular profile 2520A. Such wasted light results in a decreased luminance of the display system.

New Diffuser with Decreased Luminance Loss

Figure 26:
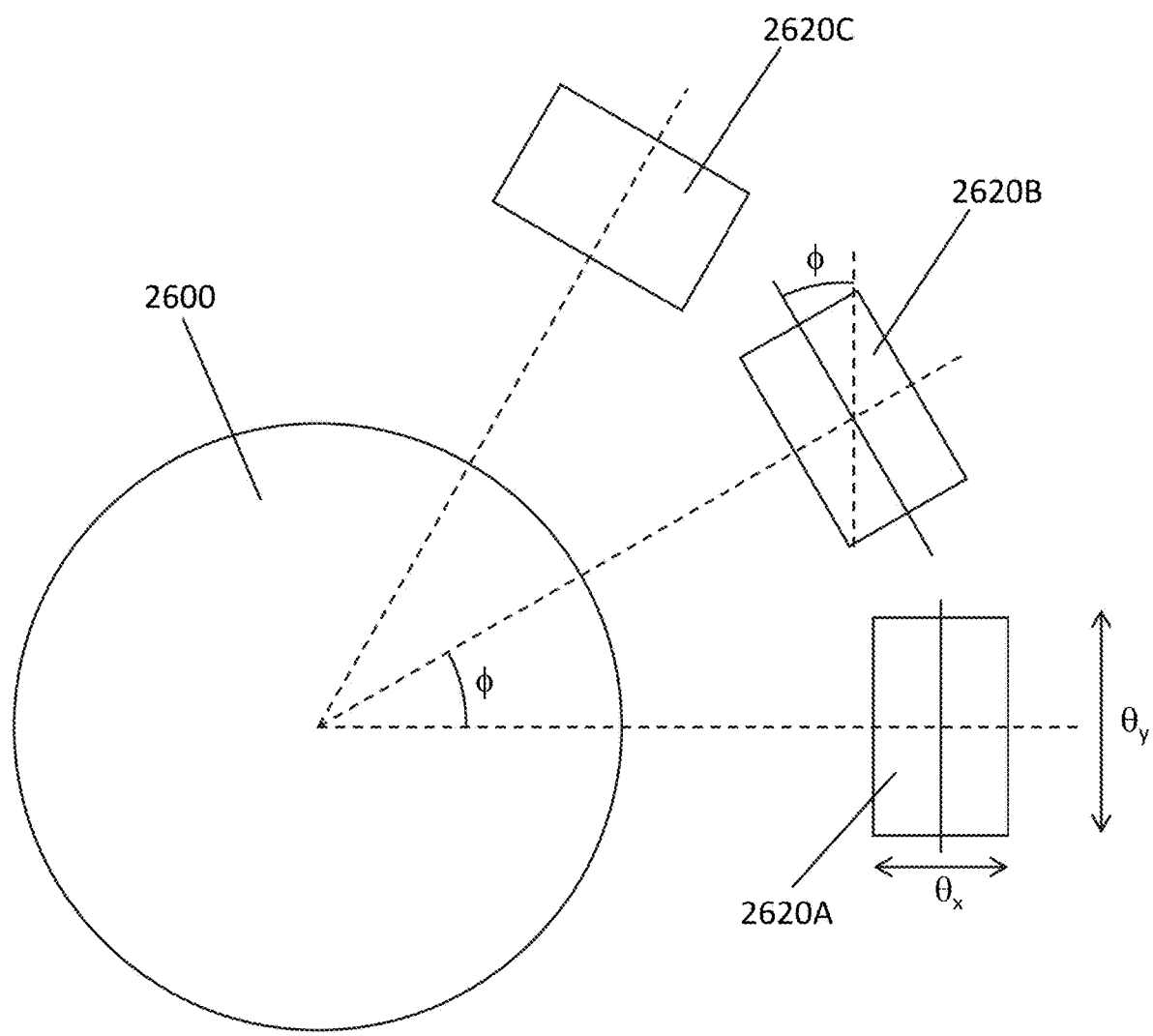
FIG. 26 shows the diffusion profile of a diffuser according to the present disclosure.

FIG. 26 schematically shows a diffuser 2600 according to the present disclosure. Like the diffuser 2400 described above, the diffuser 2600 shown in FIG. 26 has a spatially varying diffuser scattering profile. However, this variation in scattering profile is designed such that the profile is azimuthally symmetric. In other words, the scattering profile is invariant following an azimuthal rotation, as seen in FIG. 26. The inventors have surprisingly discovered that using a diffuser 2600 with such a scattering profile can reduce the luminance loss as compared to the diffuser 2400 described above. As described above, the light divergence θx, θy produces the dimensions of the scattering profiles 2620A-C.

Along any radial line on the diffuser 2600, the angular scattering profile 2620A-C does not change. That is, the angular scattering profile 2620A-C is the same with respect to the radial direction for any azimuthal angle ϕ (i.e., through any rotation by angle ϕ of the diffuser 2600). As the diffuser 2600 rotates (i.e., the azimuth is changed), the aspect of the scattering profile 2620A-C rotates accordingly (i.e., with the azimuth) to keep the orientation fixed with respect to the radial direction. That is, the angle ϕ of rotation of the second scattering profile 2620B is the same as the rotation angle ϕ of the diffuser 2600. In other words, if a single, unmoving, collimated laser beam was incident on multiple points of the diffuser 2600 (as described above) as the diffuser 2600 rotated, the observed scattering profile 2620A-C would be the same at each rotation angle ϕ.

Figure 27:
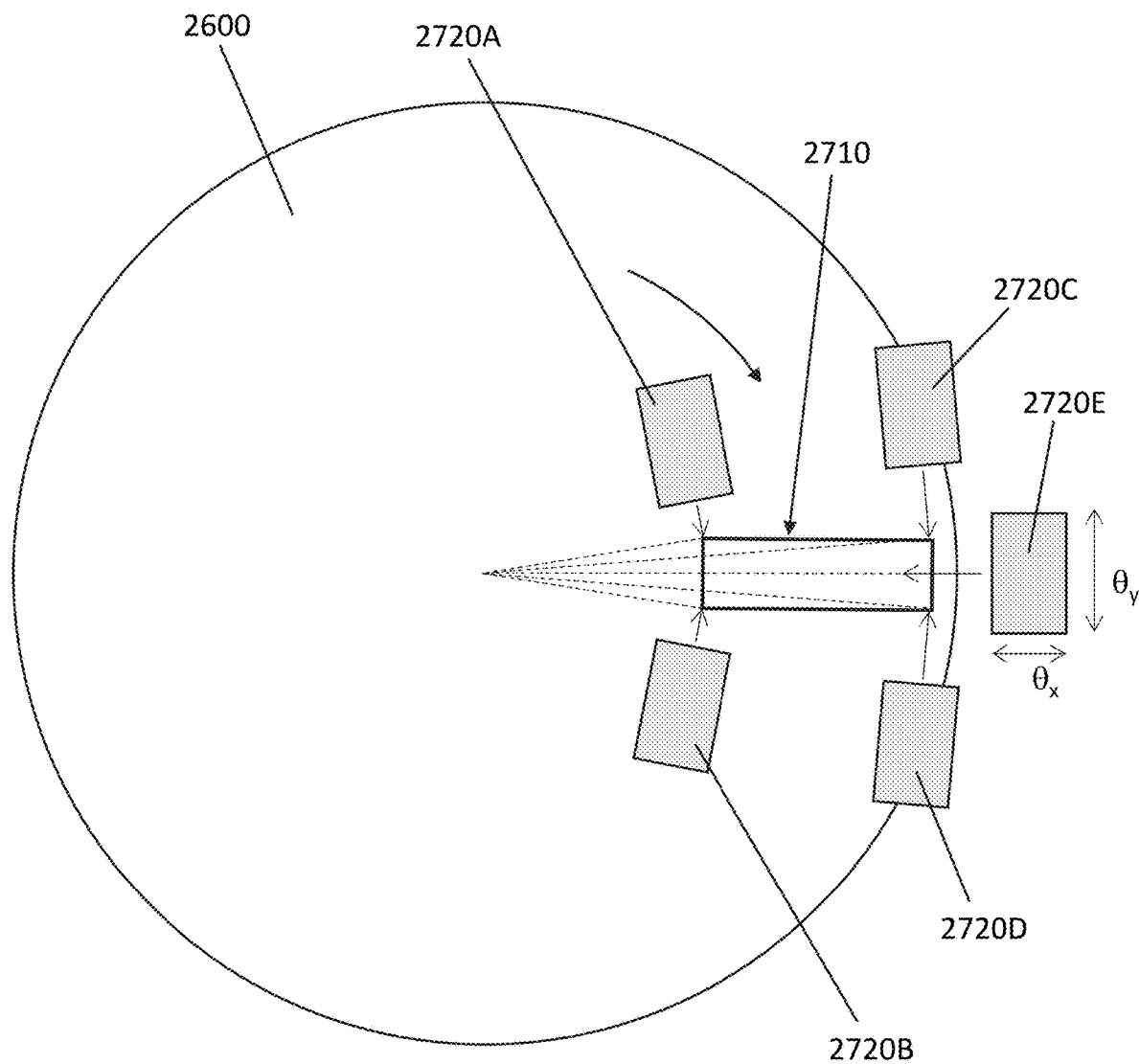
FIG. 27 shows the diffusion profile of the diffuser of FIG. 26 across a field of view.
Figure 28:
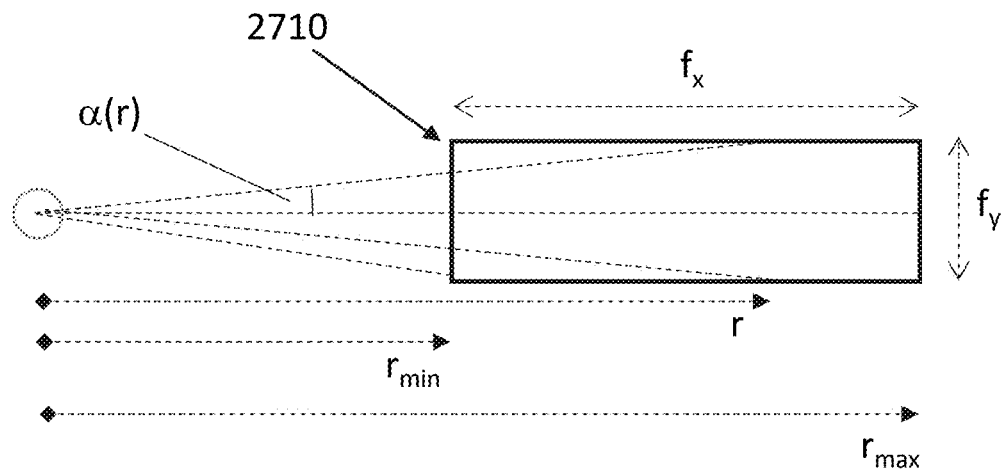
FIG. 28 shows a calculation of the diffusion profile of FIG. 27.
Figure 29:
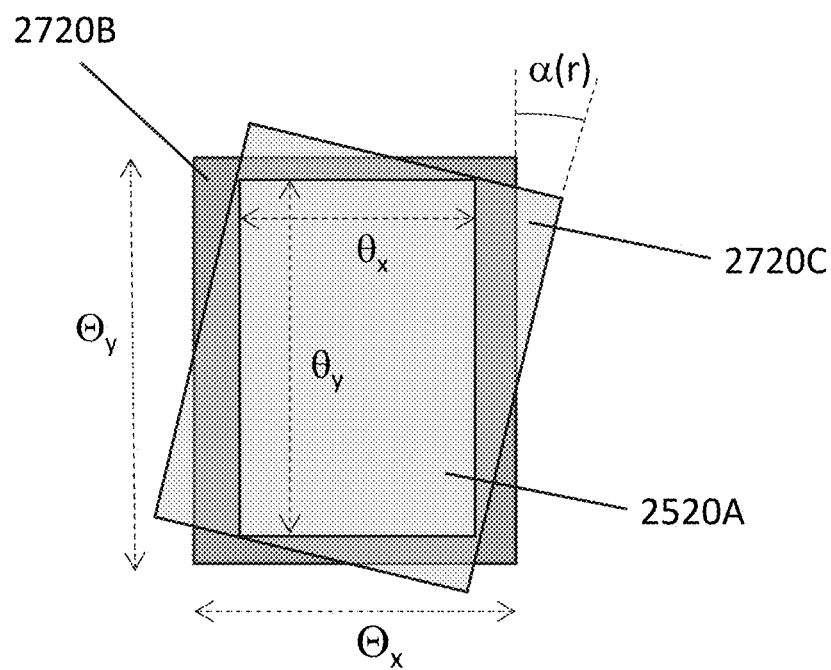
FIG. 29 shows the diffusion profile required for uniform luminance for the diffuser of FIG. 26.

FIGS. 27 to 29 show the effect this new diffuser 2600 has on the field-of-view of a head-up display and the luminance loss in the system. FIG. 27 schematically shows a rectangular field-of-view area 2710 as it would be illuminated in a head-up display on the diffuser 2600. The field-of-view area 2710 may have an aspect ratio in the range of 1:2 to 1:5. FIG. 27 also schematically shows the angular scattering profiles 2720A-E at various locations across the field-of-view area 2710. The orientation of the scattering profiles 2720A-E varies across field-of-view area 2710 due to the different angles ϕ of each point relative to the centre of the diffuser 2600. The scattering profile 2720E along the central, horizontal axis of the field-of-view area 2710 remains the same, due to this axis being coincident with the radial direction of the diffuser 2600. The remaining four scattering profiles 2720A-D show the scattering profile at each corner of the field-of-view area 2710 (i.e., the four extremes in the changes in orientation of the scattering profiles 2720A-E across the field-of-view area 2710).

In both the horizontal (x-) and vertical (y-) directions of the field-of-view area 2710, the angular scattering profile 2720A-E is rotated by an amount corresponding to the angle α(r) subtended by that field point from the centre of the diffuser 2600. That is, as you move across the field-of-view area 2710 (aside from along the central horizontal axis as described above), the profile 2720A-E rotates as this angle α(r) has changed. The orientation of each scattering profile 2720A-E is always the same with respect to the radial direction, but as you move across the field-of-view area 2710 this radial direction changes, so the orientation of the scattering profile 2720A-E changes correspondingly. This change in orientation is more noticeable in movement along the vertical (y-) direction of the field-of-view area 2710, due to the greater change in the subtended angle α(r).

As the diffuser 2600 rotates over a full 360° (i.e., through values of ϕ from 0° to) 360°, the scattering profiles 2720A-E across the field-of-view area 2710 remain the same. This is in contrast to the spatially uniform diffusion (scattering) profile of the diffuser 2400 of FIGS. 24A to 25C, whereby the scattering profiles 2520A, 2520B also rotate by the full 360° (as described above).

The amount of rotational variation of the scattering profiles 2720A-E across the field-of-view area 2710 is dependent on the maximum azimuthal angle subtended by the field-of-view area 2710 at the diffuser 2600, as shown in FIGS. 28 and 29. FIG. 28 schematically shows the field-of-view area 2710 and defines it as having a width $f_x$ and a height $f_y$. The field-of-view area 2710 is defined by a plurality of radial positions r, between minimum $r_{min}$ and maximum $r_{max}$ positions, each radial position r being at an angle α(r) relative to a horizontal central axis of the field-of-view area 2710. As described above, the rotational variation a (r) for each radial position r produces a corresponding rotation in the scattering profile 2920B, 2920C, as shown in FIG. 29. That is, for a radial position within the field-of-view aera 2710 where a (r) is zero, a first scattering profile 2720B is produced, whereas for a radial position where a (r) is not zero, a second scattering profile 2720C is produced at an angle α(r) relative to the first scattering profile 2720B. This rotation in the scattering profile 2720C produced, at any radial position r on the diffuser 2600 can be calculated as a (r)=atan($f_y$/2.r). If, for example, the values of subtended angles α(r) were in the range of 0° to 20°, as taken from the central, horizontal axis as shown in FIG. 28, then the range of subtended angles α(r) across the full field-of-view area 2710 would be in the range of −20° to 20°.

The desired rectangular scattering profile 2520A (as described above) is also shown in FIG. 29. It can be seen that the scattering profiles 2720B, 2720C produced have a larger area than the desired scattering profile 2520A (i.e., the dimensions $\Theta_x$, $\Theta_y$ of the produced scattering profiles 2720B, 2720C are larger than the dimensions $\theta_x$, $\theta_y$ of the desired scattering profile 2520A). This is so that, despite the rotation of the second scattering profile 2720C by the angle α(r), the whole area of the desired scattering profile 2520A is still covered. However, the area of light lost (i.e., the area of the produced scattering profiles 2720B, 2720C that is not part of the desired scattering profile 2520A) is not as extensive as circular total scattering profile 2520C as described above. This results in a reduced luminance loss, as described in more detail below with reference to FIG. 30.

FIG. 29 only shows rotation of the produced scattering profiles 2720B, 2720C in a clockwise direction, covering subtended angles α(r) for points in the top half of the field-of-view area 2710. However, there will also be an equivalent rotation of a produced scattering profile in a counterclockwise direction, to cover the subtended angles α(r) for points in the bottom half of the field-of-view area 2710.

That is, compared to a static rectangular diffusion/scattering profile 2520A, there will be a relative loss of luminance (but this comes with its own problems, as described above). However, compared to the spatially uniform rotating diffusion profile as described above in relation to FIGS. 24A to 25C, there will be a relative increase in luminance. This can be seen in FIG. 30, which shows, from left to right:
1. the desired rectangular scattering profile 2520A of the display system, as described above and as would be produced by a static diffuser;
2. the produced diffuser scattering profiles 2720B, 2720C of the azimuthally invariant diffuser 2600 of FIGS. 27 to 29, as described above; and
3. the circular total scattering profile 2520C of the spatially uniform rotating diffuser 2400 of FIGS. 24A to 25C, as described above.

For the static diffuser, the actual diffuser scattering profile 2520A will be identical to the desired rectangular scattering profile, as described above. As such, this represents the most efficient utilisation of available light energy and hence has the maximum luminance-albeit with the problems associated with a static diffuser as also described above. The relative luminance of a display system with such a diffuser will be inversely proportional to the solid angle subtended by the angular scattering profile. Hence, for the rectangular profile 2520A as shown in FIG. 30 with an angular extent in the x- and y-directions of $\theta_x$ and $\theta_y$ respectively, relative luminance $\propto 1/(\theta_x \times \theta_y)$.

As discussed above in relation to FIGS. 27 to 29, for a spatially varying azimuthally invariant diffuser 2600, the actual diffusion/scattering profile 2720B, 2720C required will need to cover (the envelope of) the desired profile 2520A through all radial positions r. That is, all positions as the scattering profiles 2720B, 2720C tilt relative to one another by an amount corresponding to the angular subtense a (r) of the vertical direction of the field-of-view area 2710. Therefore, the diffusion profile of this diffuser 2600 is enlarged so as to account for the tilt. As such, in this case, by analysing the relevant geometry, relative luminance $\propto 1/(\theta x \cdot \cos\alpha + \theta y \cdot \sin\alpha) \cdot (\theta x \cdot \sin\alpha + \theta y \cdot \cos\alpha)$.

Finally, as discussed above in relation to FIGS. 24A to 25C, for a conventional spatially uniform rotating diffuser 2400, the total scattering profile 2520C required to observe the desired scatter profile 2520A will be circular due to the rotation of the diffuser 2400. In other words, the total scattering profile 2520C must be circular to completely encompass the rectangular profile 2520A required by the display system. As such, in this case, by analysing the relevant geometry, relative luminance $\propto 4/\pi \cdot (\theta x2 + \theta y2)$.

Figure 30:
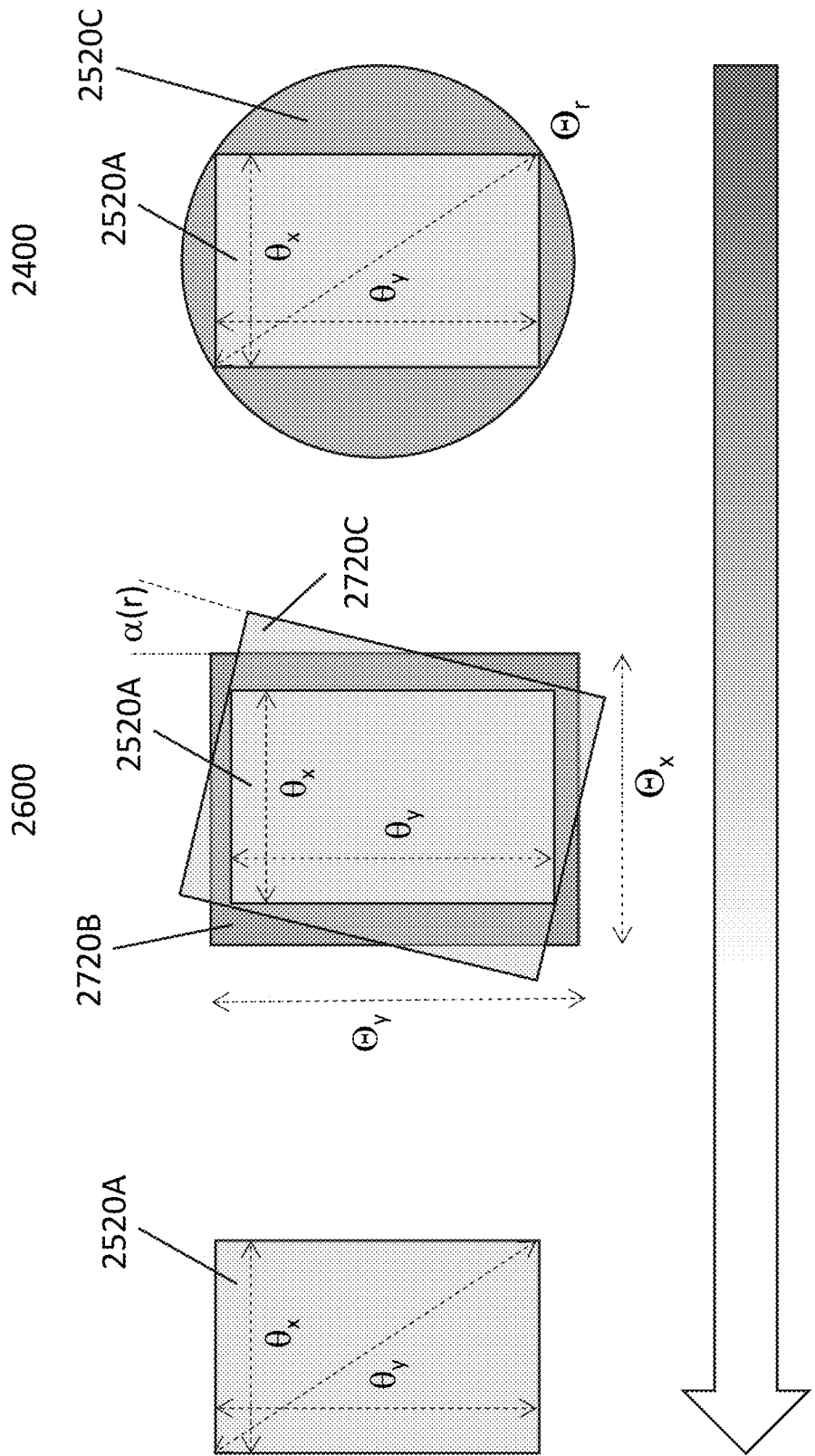
FIG. 30 shows a comparison of the diffusion profiles of a static diffuser, the diffuser of FIG. 26 and the diffuser of FIG. 24A.

The actual scattering profiles 2520C, 2720B, 2720C shown in FIG. 30 are representative of the solid angle of the scattering distribution from the diffuser 2400, 2600. The luminance calculations above are based on this calculated area, being inversely proportional to it. As such, the inventors surprisingly discovered that, as the total scattering profile 2520C of the spatially uniform rotating diffuser 2400 is greater than that of the scattering profiles 2720B, 2720C of the azimuthally invariant diffuser 2600, there is a luminance advantage for using the latter.

Further Luminance Loss Improvements

The inventors have further discovered that the extent of this luminance advantage will be dependent on the aspect ratio of the nominal rectangular diffusion/scattering profile required by the display system, being greater for a high aspect ratio (i.e., when θx«θy). As such, the "portrait" orientation of the scattering profiles shown in FIGS. 26 to 30 are preferred.

The extent of the luminance advantage will also be dependent on the vertical (y-direction) angle α(r) subtended by the field-of-view area 2710 on the diffuser 2600, being greater for a smaller angle α(r). The inventors have found several ways by which the change in this angle α(r) across the field-of-view area 2710 can be reduced. This includes increasing the diameter of the diffuser 2600, which would allow the field-of-view area 2710 to be placed further away from the centre of the diffuser 2600, reducing the change in angle α(r). A further method of achieving such a reduction in the angle α(r) would be to increase the aspect ratio and/or reduced the size of the field-of-view area 2710 on the diffuser 2710.

The smaller the subtended angle α(r), the closer the luminance of the spatially varying azimuthally invariant rotating diffuser 2600 will be to that of a static diffuser. Therefore, the smaller the subtended angle α(r), the more dependent the luminance becomes on the aspect ratio of the desired diffusion/scattering profile 2520A. The inventors have found that, by application of the above described equations, the improvement factor would have a minimum value of π/2 for a 1:1 aspect ratio (based on the ratio of the area of a circle to the area of its inscribed square), with this improvement factor progressively increasing from this value with an increasing aspect ratio. As such, even if a complete reduction of the subtended angle α(r) is possible, luminance loss will still be reduced with an increase in aspect ratio of the diffusion/scattering profile.

A variation of the diffuser 2600 of the present disclosure would be to vary the scattering profile in some respect (e.g., angular size or shape) as along the radial direction from the centre of the diffuser (i.e., the x-direction in the field-of-view area 2710), whilst still maintaining the invariance to azimuthal rotation. This can produce further marginal gains in relative luminance by allowing the scattering profile to be optimised to match the requirements at each point of the field-of-view area 2710. For example, referring to FIGS. 27 and 28 and the above-described equations, the change in tilt/orientation of the scattering profiles 2720A-E between the top and bottom of the field-of-view area 2710 reduces with an increase in distance from the centre of the diffuser 2700. Hence, the requirement to accommodate for this change in tilt/orientation (by increasing the scattering solid angle from the minimum required by the display system) reduces at a greater radial distance. The inventors have therefore found they can advantageously reduce the scattered solid angle progressively with an increase in radial distance to achieve a more efficient utilisation of available light energy. More complex variations in shape of the diffuser profiles 2720A-E to better match the requirements of the display system across the horizontal field-of-view area 2710 could also be utilised.

Figure 31:
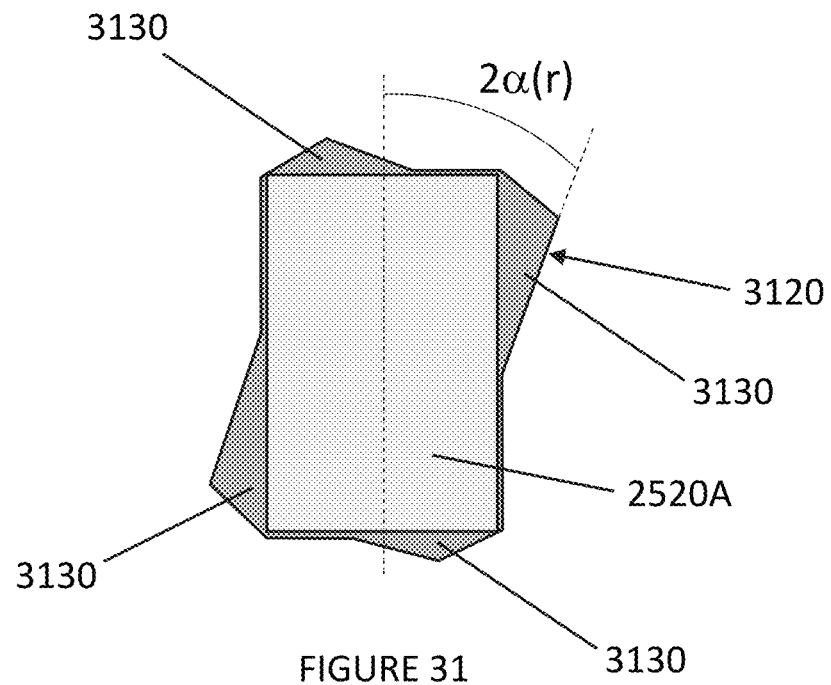
FIG. 31 shows the diffusion profile of a first variation of the diffuser of FIG. 26.
Figure 32:
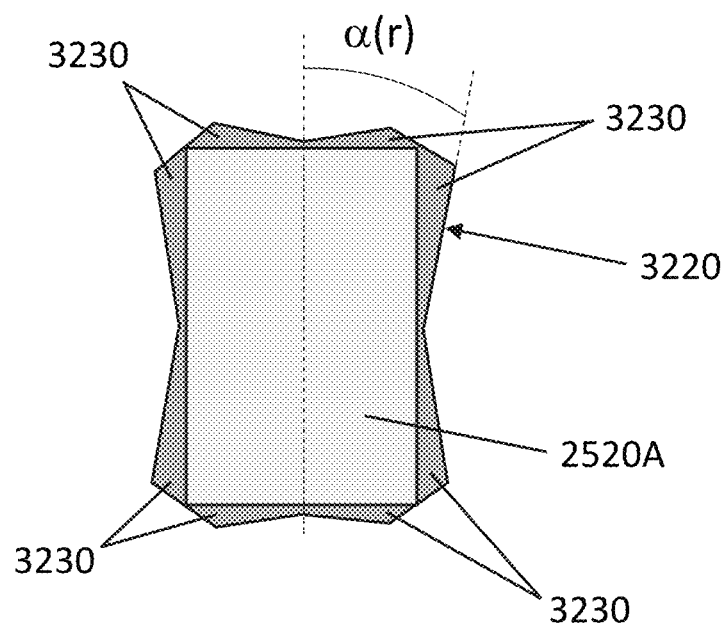
FIG. 32 shows the diffusion profile of a second variation of the diffuser of FIG. 26.

In further variations, schematically shown in FIGS. 31 and 32, more complex angular scattering profiles are used to further optimise the diffuser to the specific angles subtended by points across the field-of-view area. For example, FIGS. 31 and 32 show examples of azimuthally invariant angular scattering profiles 3120, 3220 optimised for the subtended field angle α(r). FIGS. 31 and 32 also show the desired/optimum rectangular scattering profile 2520A. The scattering profiles 3120, 3220 of FIGS. 31 and 32 are complex shapes formed of the range of rotations of the scattering profiles 2720B, 2720C described above in relation to FIG. 29. As such, the scattering profiles 3120, 3220 of FIGS. 31 and 32 have lobes or protrusions 3120, 3220 that extend from the area of the desired/optimum rectangular scattering profile 2520A. FIG. 31 shows a scattering profile 3120 based on a single, clockwise rotation of the scattering profile. As such, the lobes 3130 extend at double the subtended angle α(r) to cover all points across the field-of-view area 2710 (and as such may be arranged at an angle along the radial direction of the diffuser). FIG. 32 shows a scattering profile 3220 based on a rotation of the scatter profile in both a clockwise and counterclockwise direction. As such, each lobe 3230 extends at the subtended angle α(r). Since the area of these complex scattering profiles 3120, 3220 is less than that of the rectangular area required to support the same angular tilt, there would be a further luminance advantage with these complex profile 3120, 3220.

FIGS. 24A to 32 show the diffusers and resultant diffusion/scattering profiles schematically. As such, the skilled person would understand that the actual, physical diffusers and resultant diffusion/scattering profiles may have different shapes, orientations, sizes, aspect ratios, etc., as long as they achieve the same technical effects as described herein.

Accordingly, in various aspects, the disclosure provides a method of head-up display comprising:
displaying a hologram of a first image on a spatial light modulator;
illuminating the displayed hologram to form spatially modulated light encoded with the hologram;
propagating the spatially modulated light to a scattering diffuser disposed at an image reconstruction plane of the hologram such that an image reconstruction of the first image is formed on the scattering diffuser;
diffusely scattering, with the scattering diffuser, each pixel of the image reconstruction, wherein different pixels of the image reconstruction are scattered differently by the scattering diffuser to create a plurality of different local scattering profiles, each local scattering profile characterised by a shape and orientation;
forming an output of the scattering diffuser by combining the plurality of different local scattering profiles to create a global scattering profile;
rotating the scattering diffuser at a rotation speed such that a signal-to-noise ratio and/or a speckle contrast of the image reconstruction of the first image is reduced owing to the image reconstruction forming on different parts of the scattering diffuser within the integration time of the human eye, each different part of the scattering diffuser forming a different speckle pattern across the image reconstruction;
coordinating the scattering diffuser and rotation such that the shape and orientation of the respective local scattering profile associated with each pixel of the image reconstruction is substantially constant with rotation of the scattering diffuser; and
coupling the output of the scattering diffuser into the input port of a waveguide pupil expander, wherein a shape and orientation of the input port of the waveguide pupil expander matches the shape and orientation of the global scattering profile.

Head up displays adapted to perform such methods are also provided. The person of ordinary skill in the art will appreciate based on the above description that each "local scattering profile" corresponds to the scatter profile of each respective pixel of an image on the diffuser, while the "global scattering profile" is the combination of the "local scattering profiles" for the pixels of the image on the diffuser. Notably, a signal-to-noise ratio and/or a speckle contrast of the image reconstruction of the first image is reduced owing to the image reconstruction forming on different parts of the scattering diffuser within the integration time of the human eye. The person of ordinary skill in the art will determine signal-to-noise ratio and/or speckle contrast using conventional methods.

Another aspect of the disclosure provides a head-up display comprising:
a spatial light modulator arranged to display a hologram of a first image;
a light source arranged to illuminate the hologram displayed on the spatial light modulator to form spatially modulated light encoded with the hologram;
a scattering diffuser disposed at an image reconstruction plane of the hologram such that an image reconstruction of the first image is formed on the scattering diffuser, the scattering diffuser arranged to diffusely scatter each pixel of the image reconstruction, wherein different pixels of the image reconstruction are scattered differently by the scattering diffuser to create a plurality of different local scattering profiles, each local scattering profile characterised by a shape and orientation, and wherein the plurality of different local scattering profiles combine to create a global scattering profile forming an output of the scattering diffuser;

a rotation apparatus arranged to rotate the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction, wherein the scattering diffuser and rotation are coordinated such that the shape and orientation of the respective local scattering profile associated with each pixel of the image reconstruction is substantially constant with rotation of the scattering diffuser; and wherein each straight line from a center of rotation of the scattering diffuser is characterised by an angle from the horizontal and the orientation of the local scattering profile with respect to the horizontal increases as the angle of the straight line increases.

Analogous methods of head-up display are also provided.

Additional Features

The disclosure relates in various aspects to motion (e.g., translation or rotation) of various items such as kinoforms and diffusers. The person of ordinary skill in the art will appreciate that various apparatuses can be used to rotate items. For example, a motor can be configured, e.g., with appropriate gearing, to turn a shaft that rotates an item. Similarly, a motor can be configured, e.g., with a rack and pinion system, a cam, a screw-and-nut system, or another linear actuator to provide linear translation to an item.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

Enumerated Embodiments

Various aspects and embodiments of the disclosure are provided by the following non-limiting enumerated embodiments, which can be combined in any number and in any fashion that is not technically or logically inconsistent.

Embodiment 1. A method of head-up display comprising:
displaying a hologram of a first image on a spatial light modulator;
illuminating the displayed hologram to form spatially modulated light encoded with the hologram;
propagating the spatially modulated light to a scattering diffuser disposed at an image reconstruction plane of the hologram such that an image reconstruction of the first image is formed on the scattering diffuser;
diffusely scattering, with the scattering diffuser, each pixel of the image reconstruction, wherein different pixels of the image reconstruction are scattered differently by the scattering diffuser to create a plurality of different local scattering profiles, each local scattering profile characterised by a shape and orientation;
forming an output of the scattering diffuser by combining the plurality of different local scattering profiles to create a global scattering profile;
rotating the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction;
coordinating the scattering diffuser and rotation such that the shape and orientation of the respective local scattering profile associated with each pixel of the image reconstruction is substantially constant with rotation of the scattering diffuser; and
coupling the output of the scattering diffuser into the input port of a waveguide pupil expander, wherein a shape and orientation of the input port of the waveguide pupil expander matches the shape and orientation of the global scattering profile.

Embodiment 2. A method of head-up display comprising:
displaying a hologram of a first image on a spatial light modulator;
illuminating the displayed hologram to form spatially modulated light encoded with the hologram;
propagating the spatially modulated light to a scattering diffuser disposed at an image reconstruction plane of the hologram such that an image reconstruction of the first image is formed on the scattering diffuser;
diffusely scattering, with the scattering diffuser, each pixel of the image reconstruction, wherein different pixels of the image reconstruction are scattered differently by the scattering diffuser to create a plurality of different local scattering profiles, each local scattering profile characterised by a shape and orientation;
forming an output of the scattering diffuser by combining the plurality of different local scattering profiles to create a global scattering profile;
rotating the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction; and
coordinating the scattering diffuser and rotation such that the shape and orientation of the respective local scattering profile associated with each pixel of the image reconstruction is substantially constant with rotation of the scattering diffuser;
wherein each straight line from the center of rotation of the scattering diffuser is characterised by an angle from the horizontal and the orientation of the local scattering profile with respect to the horizontal increases as the angle of the straight line increases.

Embodiment 3. The method of Embodiment 1 or Embodiment 2 wherein the orientation of the local scattering profile with respect to the horizontal is substantially the same for all pixels of the image reconstruction on the same straight line from the center of rotation of the scattering diffuser.

Embodiment 4. The method of Embodiment 3 wherein each straight line from the center of rotation of the scattering diffuser is characterised by an angle from the horizontal and the orientation of the local scattering profile with respect to the horizontal increases as the angle of the straight line increases.

Embodiment 5. The method of any of Embodiments 1-4 wherein the shape of each local scattering profile caused by the scattering diffuser is rectangular.

Embodiment 6. The method of Embodiment 5 wherein a long dimension of the rectangular local scattering profile is perpendicular to the horizontal for pixels of the image reconstruction on the horizontal straight line from the centre of rotation.

Embodiment 7. The method of any of Embodiments 1-6 wherein the size of the local scattering profile changes with radial distance from the centre of rotation of the scattering diffuser.

Embodiment 8. The method of Embodiments 7 wherein the size of the local scattering profile decreases with radial distance from the centre of rotation of the scattering diffuser.

Embodiment 9. The method of Embodiment 8 wherein a shape of the local scattering profile changes with radial distance from the center of rotation of the scattering profile.

Embodiment 10. The method of any of Embodiments 1-9 wherein each side of the global scattering profile formed by combining the plurality of different local scattering profiles has a lobe that tapers outwards in both directions from the centre point of the corresponding side global scattering profile.

Embodiment 11. The method of Embodiment 10 wherein the lobes are such that the global scattering profile has a rotational symmetry of order 2.

Embodiment 12. The method of Embodiment 10 wherein the lobes form two lines of symmetry in the global scattering profile.

Embodiment 13. The method of Embodiment 11 wherein the two lines of symmetry of the global scattering profile are perpendicular to each other.

Embodiment 14. The method of any of Embodiments 10-13 wherein each lobe has an edge arranged at an angle relative to the corresponding side of the global scattering profile, the angle being in the range of 0° to 45°, such as 3° to 20°.

Embodiment 15. The method of any of Embodiments 10-14 wherein each side of the global scattering profile has a pair of lobes that are symmetrical about a central point along said side.

Embodiment 16. A head-up display comprising:
  a spatial light modulator arranged to display a hologram of a first image;
  a light source arranged to illuminate the hologram displayed on the spatial light modulator to form spatially modulated light encoded with the hologram;
  a scattering diffuser disposed at an image reconstruction plane of the hologram such that an image reconstruction of the first image is formed on the scattering diffuser, the scattering diffuser arranged to diffusely scatter each pixel of the image reconstruction, wherein different pixels of the image reconstruction are scattered differently by the scattering diffuser to create a plurality of different local scattering profiles, each local scattering profile characterised by a shape and orientation, and wherein the plurality of different local scattering profiles combine to create a global scattering profile forming an output of the scattering diffuser;
  a rotation apparatus arranged to rotate the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction, wherein the scattering diffuser and rotation are coordinated such that the shape and orientation of the respective local scattering profile associated with each pixel of the image reconstruction is substantially constant with rotation of the scattering diffuser; and
  a waveguide pupil expander having an input port coupled to the output of the scattering diffuser, wherein a shape and orientation of the input port of the waveguide pupil expander matches the shape and orientation of the global scattering profile.

Embodiment 17. A head-up display comprising:
  a spatial light modulator arranged to display a hologram of a first image;
  a light source arranged to illuminate the hologram displayed on the spatial light modulator to form spatially modulated light encoded with the hologram;
  a scattering diffuser disposed at an image reconstruction plane of the hologram such that an image reconstruction of the first image is formed on the scattering diffuser, the scattering diffuser arranged to diffusely scatter each pixel of the image reconstruction, wherein different pixels of the image reconstruction are scattered differently by the scattering diffuser to create a plurality of different local scattering profiles, each local scattering profile characterised by a shape and orientation, and wherein the plurality of different local scattering profiles combine to create a global scattering profile forming an output of the scattering diffuser;
  a rotation apparatus arranged to rotate the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction, wherein the scattering diffuser and rotation are coordinated such that the shape and orientation of the respective local scattering profile associated with each pixel of the image reconstruction is substantially constant with rotation of the scattering diffuser; and
  wherein each straight line from a center of rotation of the scattering diffuser is characterised by an angle from the horizontal and the orientation of the local scattering profile with respect to the horizontal increases as the angle of the straight line increases.

Embodiment 18. The head-up display of Embodiment 16 or Embodiment 17 wherein the orientation of the local scattering profile with respect to the horizontal is substantially the same for all pixels of the image reconstruction on the same straight line from the center of rotation of the scattering diffuser.

Embodiment 19. The head-up display of Embodiment 18 wherein each straight line from the center of rotation of the scattering diffuser is characterised by an angle from the horizontal and the orientation of the local scattering profile with respect to the horizontal increases as the angle of the straight line increases.

Embodiment 20. The head-up display of any of Embodiments 17-19 wherein the shape of each local scattering profile caused by the scattering diffuser is rectangular.

Embodiment 21. The head-up display of Embodiment 20 wherein the long dimension of the rectangular local scattering profile is perpendicular to the horizontal for pixels of the image reconstruction on the horizontal straight line from the center of rotation.

Embodiment 22. The head-up display of any of Embodiments 17-21 wherein the size of the local scattering profile changes with radial distance from the centre of rotation of the scattering diffuser.

Embodiment 23. The head-up display of Embodiment 22 wherein the size of the local scattering profile decreases with radial distance from the centre of rotation of the scattering diffuser.

Embodiment 24. The head-up display of Embodiment 22 wherein a shape of the local scattering profile changes with radial distance from the center of rotation of the scattering profile.

Embodiment 25. The head-up display of any of Embodiments 17-24 wherein each side of the global scattering profile formed by combining the plurality of different local scattering profiles has a lobe that tapers outwards in both directions from the centre point of the corresponding side global scattering profile.

Embodiment 26. The head-up display of Embodiment 25 wherein the lobes are such that the global scattering profile has a rotational symmetry of order 2.

Embodiment 27. The head-up display of Embodiment 25 wherein the lobes form two lines of symmetry in the global scattering profile.

Embodiment 28. The head-up display of Embodiment 26 wherein the two lines of symmetry of the global scattering profile are perpendicular to each other.

Embodiment 29. The head-up display of any of Embodiments 25-28 wherein each lobe has an edge arranged at an angle relative to the corresponding side of the global scattering profile, the angle being in the range of 0° to 45°, such as 3° to 20°.

Embodiment 30. The head-up display of any of Embodiments 25-29 wherein each side of the global scattering profile has a pair of lobes that are symmetrical about a central point along said side.

It will be apparent to those skilled in the art that various modifications and variations can be made without departing from the scope of the appended claims. The present disclosure covers all modifications and variations within the scope of the appended claims and their equivalents.

What is claimed is:

1. A method of head-up display comprising:
    displaying a hologram of a first image on a spatial light modulator;
    illuminating the displayed hologram to form spatially modulated light encoded with the hologram;
    propagating the spatially modulated light to a scattering diffuser disposed at an image reconstruction plane of the hologram such that an image reconstruction of the first image is formed on the scattering diffuser;
    diffusely scattering, with the scattering diffuser, each pixel of the image reconstruction, wherein different pixels of the image reconstruction are scattered differently by the scattering diffuser to create a plurality of different local scattering profiles, each local scattering profile characterised by a shape and orientation;
    forming an output of the scattering diffuser by combining the plurality of different local scattering profiles to create a global scattering profile;
    rotating the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction;
    coordinating the scattering diffuser and rotation such that the shape and orientation of the respective local scattering profile associated with each pixel of the image reconstruction is substantially constant with rotation of the scattering diffuser; and
    coupling the output of the scattering diffuser into the input port of a waveguide pupil expander, wherein a shape and orientation of the input port of the waveguide pupil expander matches the shape and orientation of the global scattering profile.

2. The method of claim 1, wherein the orientation of the local scattering profile with respect to the horizontal is substantially the same for all pixels of the image reconstruction on the same straight line from the center of rotation of the scattering diffuser.

3. The method of claim 2, wherein each straight line from the center of rotation of the scattering diffuser is characterised by an angle from the horizontal and the orientation of the local scattering profile with respect to the horizontal increases as the angle of the straight line increases.

4. The method of claim 1, wherein the shape of each local scattering profile caused by the scattering diffuser is rectangular.

5. The method of claim 4, wherein a long dimension of the rectangular local scattering profile is perpendicular to the horizontal for pixels of the image reconstruction on the horizontal straight line from the centre of rotation.

6. The method of claim 1, wherein the size of the local scattering profile changes with radial distance from the centre of rotation of the scattering diffuser.

7. The method of claim 6, wherein the size of the local scattering profile decreases with radial distance from the centre of rotation of the scattering diffuser.

8. The method of claim 7, wherein a shape of the local scattering profile changes with radial distance from the center of rotation of the scattering profile.

9. The method of claim 1, wherein each side of the global scattering profile formed by combining the plurality of different local scattering profiles has a lobe that tapers outwards in both directions from the centre point of the corresponding side global scattering profile.

10. The method of claim 9, wherein the lobes are such that the global scattering profile has a rotational symmetry of order 2.

11. The method of claim 9, wherein the lobes form two lines of symmetry in the global scattering profile.

12. The method of claim 10, wherein the two lines of symmetry of the global scattering profile are perpendicular to each other.

13. The method of claim 9, wherein each lobe has an edge arranged at an angle relative to the corresponding side of the global scattering profile, the angle being in the range of 0° to 45°.

14. The method of claim 9, wherein each lobe has an edge arranged at an angle relative to the corresponding side of the global scattering profile, the angle being in the range of 3° to 20°.

15. The method of claim 9, wherein each side of the global scattering profile has a pair of lobes that are symmetrical about a central point along said side.

16. A head-up display comprising:
a spatial light modulator arranged to display a hologram of a first image;
a light source arranged to illuminate the hologram displayed on the spatial light modulator to form spatially modulated light encoded with the hologram;
a scattering diffuser disposed at an image reconstruction plane of the hologram such that an image reconstruction of the first image is formed on the scattering diffuser, the scattering diffuser arranged to diffusely scatter each pixel of the image reconstruction, wherein different pixels of the image reconstruction are scattered differently by the scattering diffuser to create a plurality of different local scattering profiles, each local scattering profile characterised by a shape and orientation, and wherein the plurality of different local scattering profiles combine to create a global scattering profile forming an output of the scattering diffuser;
a rotation apparatus arranged to rotate the scattering diffuser at a rotation speed such that a signal-to-noise ratio and/or speckle contrast of the image reconstruction of the first image is reduced owing to the image reconstruction forming on different parts of the scattering diffuser within the integration time of the human eye, each different part of the scattering diffuser forming a different speckle pattern across the image reconstruction, wherein the scattering diffuser and rotation are coordinated such that the shape and orientation of the respective local scattering profile associated with each pixel of the image reconstruction is constant with rotation of the scattering diffuser; and
a waveguide pupil expander having an input port coupled to the output of the scattering diffuser, wherein a shape and orientation of the input port of the waveguide pupil expander matches the shape and orientation of the global scattering profile.

17. The head-up display of claim 16, wherein the orientation of the local scattering profile with respect to the horizontal is substantially the same for all pixels of the image reconstruction on the same straight line from the center of rotation of the scattering diffuser.

18. The head-up display of claim 17, wherein each straight line from the center of rotation of the scattering diffuser is characterised by an angle from the horizontal and the orientation of the local scattering profile with respect to the horizontal increases as the angle of the straight line increases.

19. The head-up display of claim 16, wherein the shape of each local scattering profile caused by the scattering diffuser is rectangular.

20. The head-up display of claim 19, wherein the long dimension of the rectangular local scattering profile is perpendicular to the horizontal for pixels of the image reconstruction on the horizontal straight line from the center of rotation.

21. The head-up display of claim 16, wherein the size of the local scattering profile changes with radial distance from the centre of rotation of the scattering diffuser.

22. The head-up display of claim 21, wherein the size of the local scattering profile decreases with radial distance from the centre of rotation of the scattering diffuser.

23. The head-up display of claim 21, wherein a shape of the local scattering profile changes with radial distance from the center of rotation of the scattering profile.

24. The head-up display of claim 16, wherein each side of the global scattering profile formed by combining the plurality of different local scattering profiles has a lobe that tapers outwards in both directions from the centre point of the corresponding side global scattering profile.

25. The head-up display of claim 24, wherein the lobes are such that the global scattering profile has a rotational symmetry of order 2.

26. The head-up display of claim 25, wherein the two lines of symmetry of the global scattering profile are perpendicular to each other.

27. The head-up display of claim 24, wherein the lobes form two lines of symmetry in the global scattering profile.

28. The head-up display of claim 24, wherein each lobe has an edge arranged at an angle relative to the corresponding side of the global scattering profile, the angle being in the range of 0° to 45°.

29. The head-up display of claim 24, wherein each side of the global scattering profile has a pair of lobes that are symmetrical about a central point along said side.

* * * * *